(12) United States Patent
Sippola

(10) Patent No.: US 8,012,360 B1
(45) Date of Patent: Sep. 6, 2011

(54) PRESSURE SENSOR

(75) Inventor: Clayton B. Sippola, Cincinnati, OH (US)

(73) Assignee: Clayton B. Sippola, Cincinnati, OH (US)

( * ) Notice: Subject to any disclaimer, the term of this patent is extended or adjusted under 35 U.S.C. 154(b) by 727 days.

(21) Appl. No.: 12/137,496

(22) Filed: Jun. 11, 2008

Related U.S. Application Data

(62) Division of application No. 11/562,822, filed on Nov. 22, 2006, now Pat. No. 7,451,653.

(60) Provisional application No. 60/828,718, filed on Oct. 9, 2006, provisional application No. 60/738,675, filed on Nov. 22, 2005.

(51) Int. Cl.
    *H01B 13/00* (2006.01)
(52) U.S. Cl. ............ 216/13; 73/715; 83/62.1; 361/283.4
(58) Field of Classification Search .................... 73/715; 83/62.1; 361/283.4; 216/13
    See application file for complete search history.

(56) References Cited

U.S. PATENT DOCUMENTS

| | | | |
|---|---|---|---|
| 4,425,829 A | | 1/1984 | Kranik et al. |
| 4,774,626 A | * | 9/1988 | Charboneau et al. ...... 361/283.4 |
| 5,242,641 A | | 9/1993 | Horner et al. |

OTHER PUBLICATIONS

M. Fonseca, J. English, M. Von Arx, M. Allen, "Wireless Micromachined Ceramic Pressure Sensor for High-Temperature Applications", Journal of Microelectromechanical Systems, 2002, pp. 337-343, vol. 11, No. 4.
J. English, M. Allen, "Wireless Micromachined Ceramic Pressure Sensors", Proceedings of the Twelfth IEEE Microelectromechanical Systems Conference, 1999, pp. 511-516, Orlando, Florida.
M. Zarnick, D. Belavic, K. Friedel, A. Wymyslowski, "A Procedure for Validating the Finite Element Model of a Piezoresistive Ceramic Pressure Sensor", IEEE Transactions on Components and Packaging Technologies, Dec. 2004, pp. 668-675, vol. 27, No. 4.
A. Wymyslowski, M. Santo-Zarnick, K. Friedel, D. Belavic, "Numerical Simulation and Experimental Verification of the Piezoresistivity for the Printed Thick-Film Piezoresistors", Fifth International Conference on Thermal and Mechanical Simulation and Experiments in MEMS, 2004, pp. 359-366.
DuPont Microcircuit Materials Green Tape Design and Layout Guide, 2001.
DuPont Microcircuit Materials 3554 Strain Gauge Resistor Data Sheet, 2003.

(Continued)

*Primary Examiner* — Nadine G Norton
*Assistant Examiner* — Maki A Angadi
(74) *Attorney, Agent, or Firm* — Thompson Hine LLP

(57) ABSTRACT

A pressure sensor for measuring an external pressure fabricated upon a ceramic substrate penetrated by a via extending from the top to the bottom of the ceramic substrate is disclosed. A sacrificial layer is deposited on a portion of the top of the ceramic substrate in communication with a via. A diaphragm material is then deposited on the sacrificial layer, thereby creating a diaphragm surface. A sensor element for transducing a mechanical deflection into an electrical signal is applied to the diaphragm surface. When the sacrificial layer is removed, the diaphragm is able to deflect in response to the external pressure, which is sensed by the sensor element in order to measure the external pressure.

8 Claims, 22 Drawing Sheets

OTHER PUBLICATIONS

C. Canali, D. Malavasi, B. Morten, M. Prudenziati, A. Taroni, "Strain Sensitivity in Thick-Film Resistors", IEEE Transactions on Components, Hybrids, and Manufacturing Technology, 1980, pp. 421-423, vol. CHMT-3, No. 3.

M. Lefort, V. Djafari, B. Jouffrey, C. Savary, "Thick Film Piezoresistive Ink: Application to Pressure Sensors", The International Journal of Microcircuits and Electronic Packaging, 2000, pp. 191-202, vol. 23, No. 2.

D. Kerns, Jr., W. Kang, A. Al-Ali, "Piezoresistive Effects in Thick Film Resistors for Strain Sensing Applications", SoutheastCon, 1989, pp. 348-350, Columbia, South Carolina.

DuPont Microcircuit Materials Green Tape Design and Layout Guide—LTCC Process, 2004.

C. B. Sippola, C. H. Ahn, "A Ceramic Sealed Cavity with Screen Printed Ceramic Diaphragm", Ceramic Interconnect Technology Conference, 2004, pp. 179-182, Denver, CO.

* cited by examiner

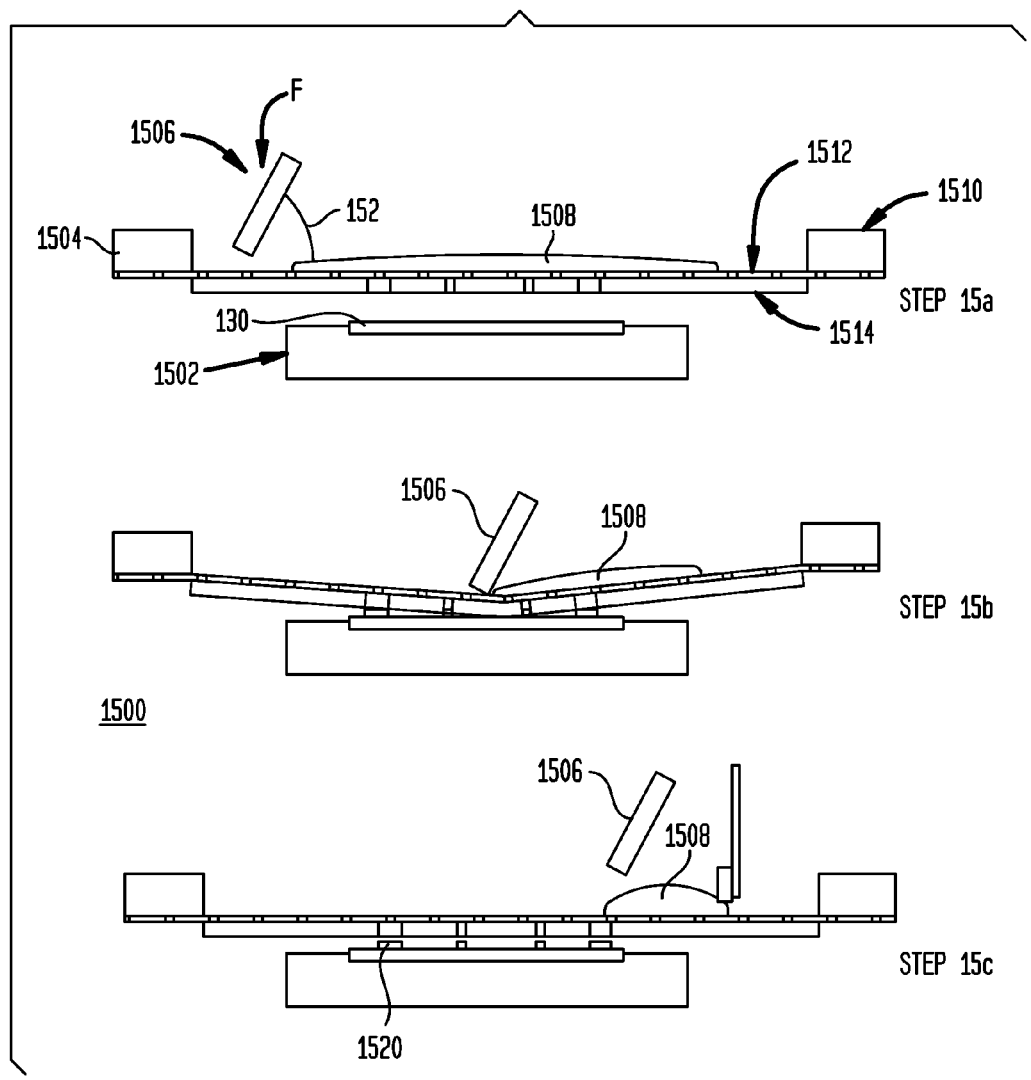

1802

1804

1806

1808

1810

1812

PRESSURE SENSOR

CROSS REFERENCE TO RELATED APPLICATION

This application is a divisional application of U.S. application Ser. No. 11/562,822, filed Nov. 22, 2006 now U.S. Pat. No. 7,451,653, which claims the benefit of U.S. Provisional Ser. No. 60/828,718 filed on Oct. 9, 2006 and U.S. Provisional Ser. No. 60/738,675 filed on Nov. 22, 2005.

TECHNICAL FIELD

The present invention relates to pressure sensors, and more particularly to ceramic pressure sensors adapted for use in harsh environments.

BACKGROUND

Pressure sensors are transducers adapted to measure pressure, both absolute and relative, in an environment. Some environments are classified as harsh environments, meaning that the fluid and/or the environment itself is particularly damaging to the pressure sensor due to temperature, corrosive fluids, or combinations thereof. Some examples of harsh environments include inside the human body, within combustion chambers, and within chemical process control equipment. Many existing pressure sensors are not suitable for high temperature or harsh environment applications due to the pressure sensors unique material, electrical, mechanical and thermal properties.

Pressure sensors capable of operating in harsh environments are useful in a variety of pressure sensing applications. Some of the various applications are listed below:

Automotive Industry

Engine control and lubricant pressure, engine oil pressure, air intake and exhaust pressure, water pressure, fuel pressure, brake line pressure, power steering systems, anti-lock braking systems, fuel injection, in-cylinder pressure, automatic transmission worm channel pressure, powertrain and airbag testing.

Aerospace/Avionics Industry

Turbine engine combustion, air turbulence, hydraulic systems for brakes, flaps and rudders, pneumatic systems, cabin/airborne pressure, altimeters, stall detection and control, tire pressure, main and auxillary gear box lubrication oil, engine oil pressure, fuel pressure, bleed air pressure, engine torque pressure, fuel injection, turbochargers, and air pressure testing of wings, engine, propeller, fuselages.

Defense Industry

Tank and assault vehicle turbine engines and hydraulic systems, rocket launchers, missiles, shock wave, blast, explosion, detonation, and ballistics testing.

Household Appliances

Washing machine tub fill, HVAC airflow, vacuum cleaner airflow, and oil fuel tank pressure.

Marine

Engine control systems, firemains, depth sensors, desalinisation systems, rudder control systems, subsea wellhead controls, low and high pressure air compressors, shipboard pneumatic systems, air guns, and towed seismic arrays.

Medical

Respirators, ventilators, and spirometers.

Oil Field Industry

Well logging, well-head controls, well pressure, product separation/transmission systems, and seismic exploration.

Other Industries

Paper slurry delivery systems, fossil fuel exploration, geothermal and geological exploration, meteorological pressure sensing, environmental data logging, weather stations and data buoys, oceanographic data logging, industrial process controls for fluid filling, paint and ink pressure, food and beverage pressure, nuclear power generators, plastics extrusion, injection and compression molding.

This exemplary listing of applications for a harsh environment pressure sensor is neither exhaustive nor complete, but is merely provided to highlight some potential uses.

There is a need for pressure sensors that have material, electrical, mechanical and thermal properties that enable the sensor to operate in harsh environments.

BRIEF DESCRIPTION OF THE DRAWINGS

The accompanying figures depict multiple embodiments of a ceramic pressure sensor suitable for use in harsh environments. A brief description of each figure is provided below. Elements with the same reference numbers in each figure indicate identical or functionally similar elements. Additionally, the left-most digit(s) of a reference number identifies the drawings in which the reference number first appears.

FIG. 15 details a schematic view of a thick film screen-printing process for an embodiment of a fabrication process for a ceramic pressure sensor.

DETAILED DESCRIPTION

Structure of an Embodiment of a Capacitive Pressure Sensor

Figure 1:
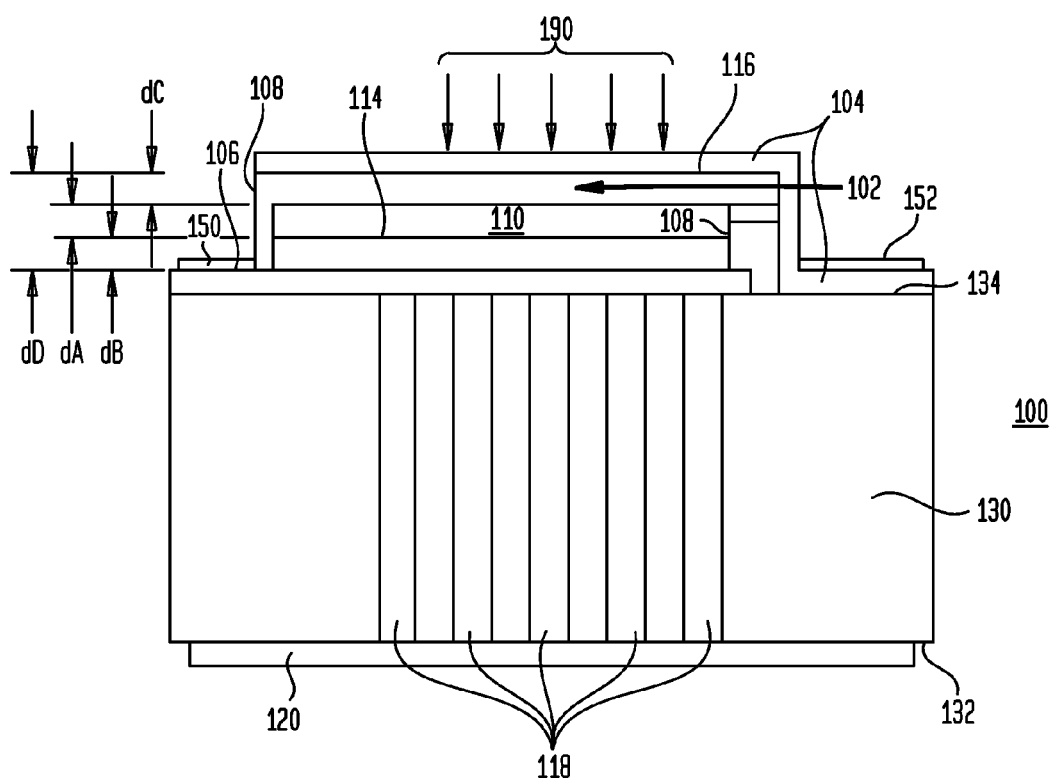
FIG. 1 is a cross-section of an embodiment of a ceramic pressure sensor.

FIG. 1 depicts a cross-section of an embodiment of a pressure sensor pressure sensor 100 with a capacitive transducer. The embodiment of a pressure sensor 100 comprises a substrate 130. The substrate 130 in the embodiment depicted is 96% $Al_2O_3$ (alumina). Other embodiments of the substrate 130 are fabricated from generally ceramic substrates, including 92%, 94%, and 99.6% $Al_2O_3$, BeO (beryllia) and AlN (aluminum nitride) or equivalents thereof. In general, the higher purity alumina ceramics have higher flexural strength, elastic modulus and higher thermal conductivity. Beryllia has the highest thermal conductivity of ceramic substrates.

For embodiments that incorporate separate electronic components, such as those depicted in FIG. 26 and described below, or for integrated electronics mounted on the substrate 130, the substrate 130 material is selected so as to substantially match the thermal expansion characteristics of the substrate 130 to the materials used to create the active electronic components. The ability of the substrate 130 to substantially match the thermal expansion coefficients of the electronic components is more critical at high temperatures where thermal mismatch becomes more critical and causes failure of the electronic components mounted on the substrate 130. The separate electronic components are fabricated using different types of materials as known to those of ordinary skill in the art, including but not limited to: single crystal and amorphous silicon (Si) and silicon on insulator (SOI), germanium (Ge), gallium arsenide (GaAs), Gallium Nitride (GaN), and Silicon Nitride (SiN) and equivalents thereof. In each of these cases, when integrating the electronic components on the substrate 130, the substrate 130 material is selected to substantially match the thermal expansion characteristics of the electronic components within the requirements of the expected thermal range for the pressure sensor 100. In one embodiment, where electronic components fabricated from single crystal silicon are mounted on the substrate 130, a substrate 130 material with a good coefficient of expansion match is selected. In this one embodiment, for an alumina substrate 130 material, the lower purity alumina ceramics have a lower density and better thermal coefficient of expansion match to silicon and are thus more suitable for higher temperature capabilities compared to other purities of alumina. In embodiments of the pressure sensor 100 that are specifically suited for the highest temperature ranges AlN is used as the substrate 130 material since it has the best thermal expansion match to silicon.

Thus the designer creating an embodiment of the pressure sensor 100 selects the substrate 130 material based on multiple criteria. First, if the pressure sensor 100 is fabricated for use in high temperatures (above 120 C) is integrated with other components such as electronics mounted on the substrate 130, or interfaces with other elements such as electronics packaging materials, then matching the thermal expansion properties of the substrate 130 to the material of the electronics components or electronics packaging is critical and drives substrate 130 material selection. In other applications the substrate, 130 materials are selected based on the type of environment the pressure sensor 100 will be exposed, including but not limited to, the thermal and chemical environments.

In the embodiment depicted, the substrate 130 is 0.025" thick. Other substrate 130 thicknesses are selected by those of ordinary skill in the art based on the requirements of specific applications. The substrate 130 of the pressure sensor 100 has a series of vias 118 that form a path through the substrate 130 linking the substrate bottom surface 132 to the substrate top surface 134. In this embodiment, the vias 118 emerging on the substrate bottom surface 132 is capped by a sealing dielectric 120 to form a sealed reference, or gauge pressure sensor. In still other embodiments, the sealing dielectric 120 is eliminated and the vias 118 are open to the environment on the substrate bottom surface 132, thereby enabling differential pressure measurement. In the embodiment depicted in FIG. 1, the substrate 130 is about 0.31" long and 0.15" wide.

The pressure sensor 100 is further comprised of a bottom electrode 106 located on the substrate top surface 134. A diaphragm 102, comprising a diaphragm bottom surface 114 and a diaphragm top surface 116 separated by diaphragm walls 108, is formed substantially above the bottom electrode 106 such that the bottom face of the diaphragm bottom surface 114 is directed towards or in contact with the bottom electrode 106. The diaphragm walls 108 extend away from the surface of substrate top surface 134. The diaphragm 102 further defines a cavity 110 within the interior surface of the diaphragm walls 108, the diaphragm top surface 116 and the diaphragm bottom surface 114. A top electrode 104 is substantially located across the diaphragm top surface 116. A portion of the top electrode 104 extends beyond the diaphragm 102 and substantially rests on the substrate top surface 134. This portion of the top electrode 104 substantially resting on the substrate top surface 134 is referred to as the termination portion of the top electrode 104 while the portion of the top electrode 104 substantially located on the diaphragm top surface 116 is referred to as the sensing portion of the top electrode 104. Similarly the portion of the bottom electrode 106 underneath the diaphragm bottom surface 114 is referred to as the sensing portion of the bottom electrode 106 and the other portion of the bottom electrode 106 not underneath the diaphragm 102 is referred to as the termination portion of the bottom electrode 106. The diaphragm bottom surface 114 is also referred to herein as the diaphragm lower surface.

A bottom electrode termination 150 and top electrode termination 152 layers are applied to the termination portions of the bottom electrode 106 and top electrode 104 respectively. The bottom electrode termination 150 and top electrode termination 152 layers are selected such that an electrical connection is formed between the top electrode 104 and the bottom electrode 106 and external electronics and connectors that are integrated with the substrate 130 in some embodiments or external to the substrate 130. The bottom electrode termination 150 and the top electrode termination 152 in various embodiments are wirebondable/weldable termination metallization elements including but not limited to gold and silver. The bottom electrode termination 150 and the top electrode termination 152 in other embodiments are solderable/brazeable termination metallizations such as platinum gold, platinum silver, and palladium silver and combinations thereof. The termination metallization elements in one embodiment are applied using thick film screen printing. In still other embodiments, the termination metallization elements are deposited using chemical vapor deposition or physical vapor deposition processes. One non-exhaustive example of a physical vapor deposition process is sputtering.

Capacitive Transducer

The embodiment of the pressure sensor 100 depicted in FIG. 1 utilizes a capacitive transducer element. The capacitive transducer element is comprised of the top electrode 104 and the bottom electrode 106 that are separated by a distance, in this case (dD). The distance dD is the sum of the thickness (dB) of the diaphragm bottom surface 114, the thickness (dC) of the diaphragm top surface 116 and the overall cavity height (dA) as detailed in FIG. 1. The capacitance of the capacitive transducer element varies according to the change in the overall distance (dD) and more specifically due to deflection of the top electrode 104 affixed to the diaphragm top surface 116, also described herein as the diaphragm upper surface, either toward or away from the bottom electrode 106 due to the external pressure 190. The change in the measured capacitance of a pressure sensor 100 with a capacitive transducer element is correlated to the external pressure 190 and is measured using various techniques known to those of ordinary skill in the art for measuring changes in capacitance.

Electrode Configuration

Figure 2:
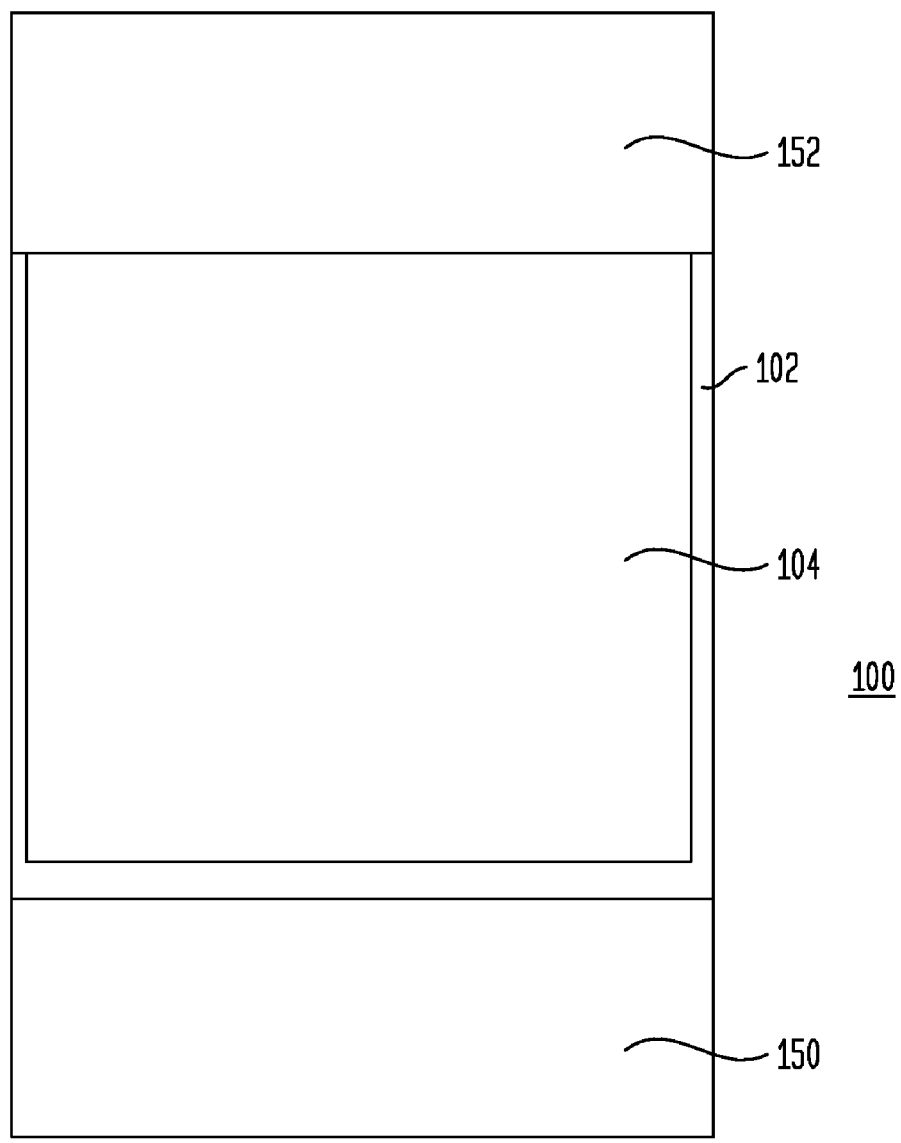
FIG. 2 is a planar view of the top surface of an embodiment of a ceramic pressure sensor.

Referring now to FIG. 2, a planar view of a top surface of the pressure sensor 100 is detailed. In this view, an upper sensor element and lower sensor element are present. In this embodiment of a pressure sensor 100 with capacitive transducer, the upper sensor element is a top electrode 104 and the lower sensor element is a bottom electrode 106 (not shown in FIG. 2). In this view, the top electrode 104 is shown placed within the extents of the diaphragm 102. The top electrode 104 is aligned with the diaphragm 102 such that a portion of the top electrode 104 extends beyond the diaphragm 102 and lies on the substrate top surface 134. This portion is also referred to as the electrode sensing portion of the top electrode 104. In FIG. 2, the portion of the top electrode 104 that lies on the substrate top surface 134, also called the electrode termination portion, is covered with a top electrode termination 152. The top electrode termination 152 in the embodiment depicted substantially covers the entire portion of the top electrode 104 that lies on the substrate top surface 134. In alternative embodiments, the top electrode termination 152 has substantially reduced surface area and electrode termination portions of the top electrode 104 that lie on the substrate top surface 134 are substantially exposed.

In this embodiment, the top electrode 104 is substantially offset from three of the four sides of the diaphragm 102 such that it is electrically isolated from the bottom electrode 106 (not shown in FIG. 2). The bottom electrode 106 that is not covered by the diaphragm 102 in the embodiment shown in FIG. 2 is substantially covered with a bottom electrode termination 150. In alternative embodiments, the bottom electrode termination 150 has substantially reduced surface area and portions of the bottom electrode 106 are substantially exposed.

In still other embodiments, the diaphragm 102 is selected from other shapes, including but not limited to trapezoidal, rhomboidal, pentagonal, hexagonal, and other multi-faceted shapes of large numbers of sides including those shapes that are substantially circular in nature. In all of these embodiments, the top electrode 104 is adapted relative to the diaphragm 102 and more specifically the diaphragm top surface 116 such that it is electrically isolated from the bottom electrode 106.

Piezoresistive Transducer

Figure 16A:
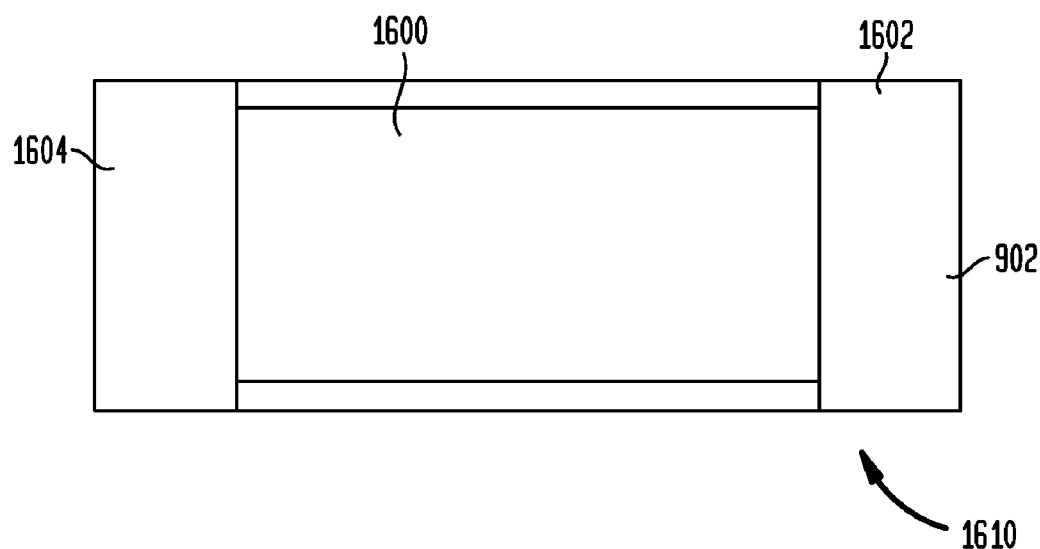
FIG. 16a-b shows a planar view of a second embodiment of a ceramic pressure sensor.

Another embodiment of a pressure sensor 1610 with a piezoresistive transducer is depicted in FIG. 16*a*. A pressure sensor 1610 with a piezoresistive transducer eliminates the bottom electrode 106 found in embodiments of a pressure sensor 100 with a capacitive transducer and forms the top electrode 106, or upper sensor element, with a piezoresistive element 1600. The piezoresistive element 1600 responds to a change in mechanical stress applied to the piezoresistive element 1600 by changing the electrical resistance of the piezoresistive element 1600 material. The piezoresistive element 1600 in one embodiment is adapted to cover a substantial portion of the diaphragm top surface 116. In another embodiment, the piezoresistive element 1600 is patterned such that the piezoresistive material is primarily deposited in areas of strain or deformation of the diaphragm top surface 116 when it is defected under pressure.

Figure 17:
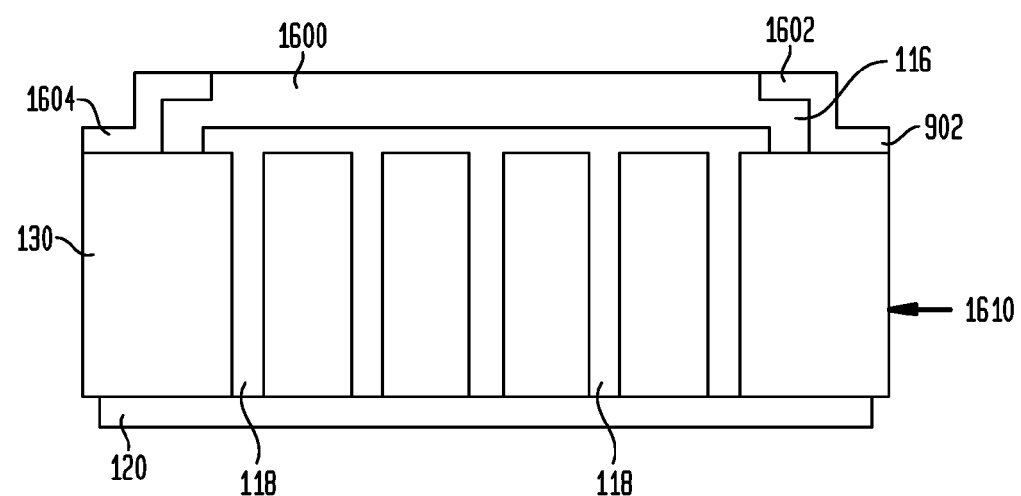
FIG. 17 details a cross sectional view of a second embodiment of a ceramic pressure sensor.

An embodiment of a pressure sensor 1610 with a piezoresistive transducer in a first embodiment depicted in FIG. 17 has a first piezoresistive electrode termination 1602 and a second piezoresistive electrode termination 1604, one on each end of the die 902 such that an electrical resistance measurement is made between the first piezoresistive electrode termination 1602 through the piezoresistive element 1600 and the second piezoresistive electrode termination 1604. These first and second piezoresistive electrode terminations 1602, 1604 are made on the termination portion of the pressure sensor 1610 with piezoresistive transducer.

Figure 16B:
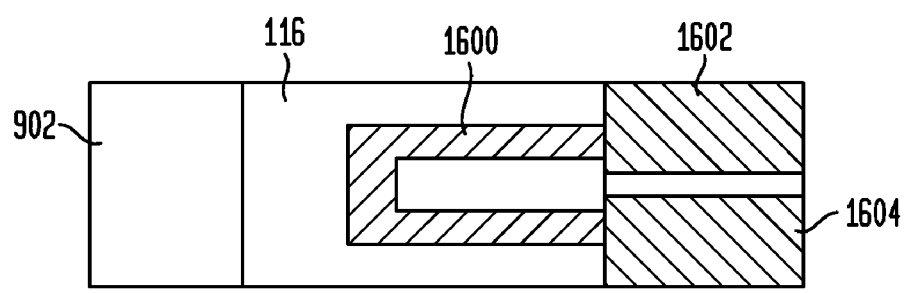

In another embodiment, depicted in FIG. 16*b*, the first piezoresistive termination 1602 and the second piezoresistive termination 1604 are fabricated on the same end of the die 902 and the electrical contacts are separated by a gap. In this embodiment, the piezoresistive element 1600 is adapted to a substantially serpentine structure, or in the embodiment depicted a single loop such that there are multiple turns of the piezoresistive element 1600 over areas of the diaphragm top surface 116 that undergo the greatest strain when exposed to an external pressure 190. In yet another embodiment, four piezoresistive terminations (not shown) are arranged with a pair on each side of the die 902. Two separate piezoresistive elements 1600 are arranged on the surface of the diaphragm top surface 116 with a second set of piezoresistive elements 1600 arranged between the piezoresistive electrode terminations 1602 and 1604 to form a wheatstone bridge configuration.

Piezoelectric Transducer

In still another embodiment, a piezoelectric element is used as the top electrode 104 to form a pressure sensor 1610 with a piezoelectric electrode whereby the piezoelectric element replaces the piezoresistive element 1600 of the embodiment of the pressure sensor 1610 with piezoresistive transducer shown in FIGS. 16 and 17. In this embodiment, the piezoelectric element generates a voltage in response to an applied strain to the piezoelectric element due to the deflection of the diaphragm top surface 116.

Screen Print Techniques

The following process description refers to screen printing techniques that are used in some fabrication methods described herein. FIG. 15 depicts an exemplary screen printing process, comprising steps 15*a* through 15*c* for applying an arbitrary screen print paste 1508 to a substrate 130 to create a desired pattern of features 1520 on the surface of the substrate. The screen print process 1500 is comprised of multiple elements. A nest or holder 1502 is used to secure the substrate 130 relative to a screen 1510.

The screen 1510 is comprised of a substantially rigid screen frame 1504 that holds a screen mesh 1512 within the boundaries of the screen frame 1504. The screen mesh 1512 is selectively coated with an emulsion 1514. The emulsion 1514 substantially closes the screen mesh 1512 in certain areas thereby preventing the flow of the screen print paste 1508 through the mesh. The combination of the emulsion 1514 with the mesh 1512 creates a mask pattern suitable for limiting the flow of the screen print paste 1508 through the mesh 1512 thereby allowing a specific feature geometry to be deposited on the substrate 130. The screen mesh 1512 and emulsion 1514 are selected based on multiple parameters, including but not limited to the desired feature size in both vertical and planar dimensions and the mechanical and chemical characteristics of the screen print paste 1508. The screen mesh 1512 parameters include the material used for the screen mesh 1512, the tension of the screen mesh 1512, the diameter of the wires comprising the screen mesh 1512, the density of wires in the screen mesh 1512, the angle that the screen mesh 1512 is attached to the screen frame 1504 and the pattern used to create the mesh including the relative spacing of the voids in the screen mesh 1512 and the shape of the overlapping wires in the screen mesh 1512 as they cross.

The screen print process 1500 for applying the screen print paste 1508 to the substrate 130 to create an arbitrary feature 1520 begins with aligning the substrate 130 relative to the screen 1510. The screen mesh 1512 is then coated with the screen print paste 1508 to be printed. The screen 1510 is held a specific distance off the surface of the substrate 130 and a squeegee 1506 is pushed into the screen 1510 with an applied force (F) and held at a desired angle ($\alpha$) relative to the surface of the undeflected screen mesh 1512. The squeegee 1506 is then swept across the surface of the screen mesh 1512 (see Step 15*b*). The action of the squeegee 1506 pushes the screen print paste 1508 through the screen mesh 1512 where the emulsion 1514 is absent and onto the substrate. At the end of the sweep across the screen mesh 1512, the squeegee 1506 is retracted from the screen 1510 and the pattern of features 1520 with specific feature geometry is formed by the extrusion of the screen print paste 1508 through the screen mesh 1512 is left behind on the surface of the substrate 130. The pattern of features 1520 immediately after the screen-print process 1500 is in an uncured or green state, or when referring to a specific feature a green feature. The screen print paste 1508 that creates the green features typically consists of materials and print vehicles. The print vehicles are used to impart screen-printing properties, produce the desired drying rate and supply binding properties during the drying and firing process. Additional processing, typically in the form of drying and firing are used to cure the pattern of features 1520, remove the print vehicles and achieve the desired final material properties.

Exemplary Fabrication Process

Referring now to FIG. 3*a-g*, a series of cross-sectional images (left side) and planar views (right side) of one embodiment of an exemplary fabrication process flow for manufacturing a pressure sensor 100 with a capacitive transducer element is depicted.

Step One

Figure 3A:
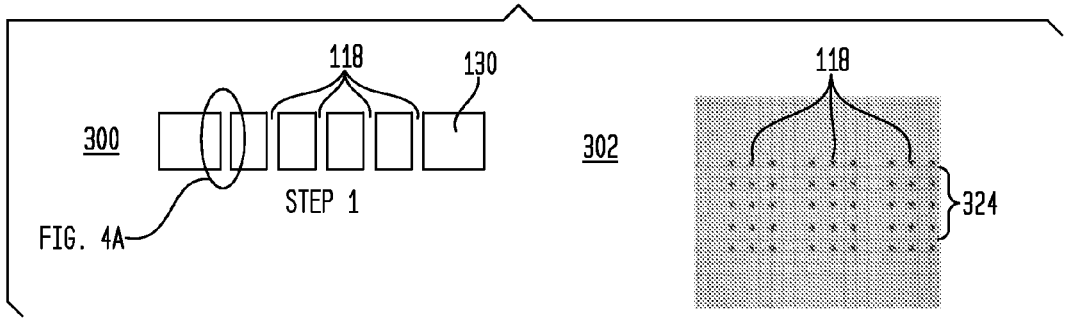
FIGS. 3a-g depicts an exemplary process flow (cross-sectional view) on left side and planar view on the right side of a multi-step fabrication process for an embodiment of a ceramic pressure sensor.

The first step 302 of the fabrication process flow 300, shown in FIG. 3*a*, is to prepare the substrate 130 by creating the vias 118. The vias 118 in one embodiment are fabricated using a laser to ablate the material of the substrate 130 and create the vias 118. In another embodiment, the vias 118 are created using other techniques known to those of ordinary skill in the art to create vias 118 with the desired size and depth in the substrate 130 material, including but not limited to ultrasonic machining, water jet and abrasive jet machining and mechanical punches and drills. In still another embodiment, the substrate 130 is formed in a green state with the desired pattern of vias 118 in the preform such that the vias 118 are substantially maintained after the substrate 130 is fired. The relative size, number and spacing of the vias 118 is defined using the parameters outlined above. For the embodiment depicted, a pattern of 15 vias 118 is used on a 3×5 hole pattern. The center-to-center distance for the embodiment shown between horizontal vias 118 is about 0.040". The center-to-center distance for the embodiment shown between vertically vias 118 is about 0.040". The diameter of the vias 118 in the embodiment shown is about 0.010".

Figure 9:
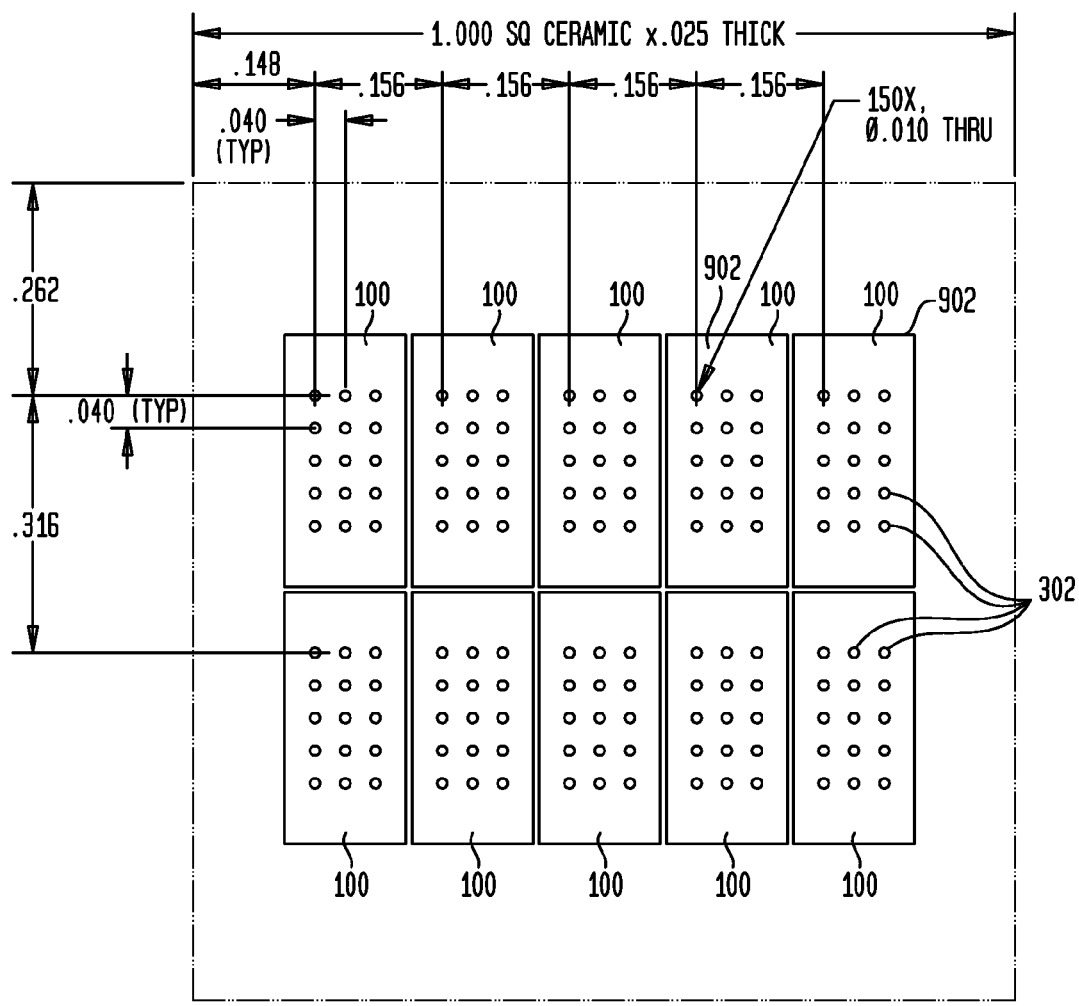
FIG. 9 is a top view of an array of exemplary ceramic substrates of an embodiment of a ceramic pressure sensor.

FIG. 9 details an embodiment of a pattern of vias 118 typical of the first step 302 in the embodiment of the fabrication process flow 300 shown in FIG. 3*a*. The substrate 130 shown in FIG. 9 is a commercially standard 1" square by 0.25" blank 910 that has been subdivided into ten separate pressure sensor 100 dies 902. Each individual die 902 in the embodiment depicted has a pattern of fifteen vias 118. Due to the arrangement of the individual dies 902 on the blank 910 the distance between vias 118 on a single die 902 at equivalent locations in the via 118 pattern is about 0.156" in the horizontal direction and 0.316" in the vertical direction. In other embodiments, various commercially available sized blank 910 substrates are used.

Figure 4A:
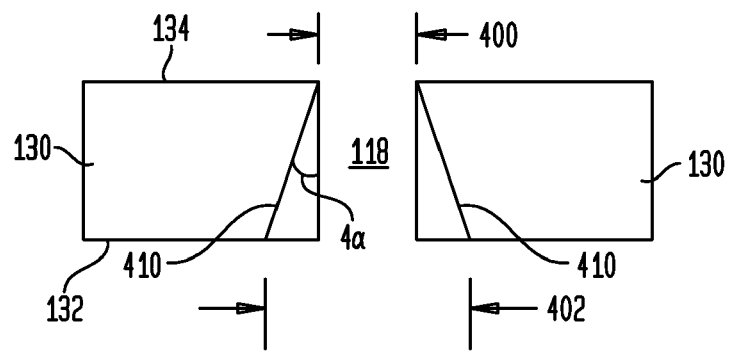
FIG. 4a shows an embodiment of a single via from the exemplary process flow shown in FIGS. 3a-g.

FIG. 4*a* details a close up cross section of a via 118 through the substrate 130. The via 118 is defined by a top aperture 400 located on the substrate top surface 134 and a bottom aperture 402 located on the substrate bottom surface 132. In the case of laser ablation machining, the side walls 410 are angled due to the spreading of the laser spot through the substrate 130. The spreading in one embodiment creates an angle or taper to the side walls 410.

This taper or angle is manifest as a spreading angle ($4\alpha$) in that it is between about three degrees and about ten degrees. The spreading angle ($4\alpha$) in still another embodiment is between about five degrees and about thirty degrees. In still another embodiment, the spreading angle ($4\alpha$) is about forty-five degrees. The substrate 130 in a first embodiment is about 0.025" thick. In this first embodiment, the top aperture 400 is about 0.010" and the bottom aperture 402 is about 0.015". In still another embodiment, with the same thickness substrate 130, the first aperture 400 is about 0.010" and the second aperture 402 is about 0.024". In still other embodiments the first aperture 400 and the second aperture 402 is selected from a variety of geometric shapes including, but not limited to, circles, triangles, rectangles, squares, trapezoids and other multi-faceted geometric shapes.

Step Two

Figure 3B:
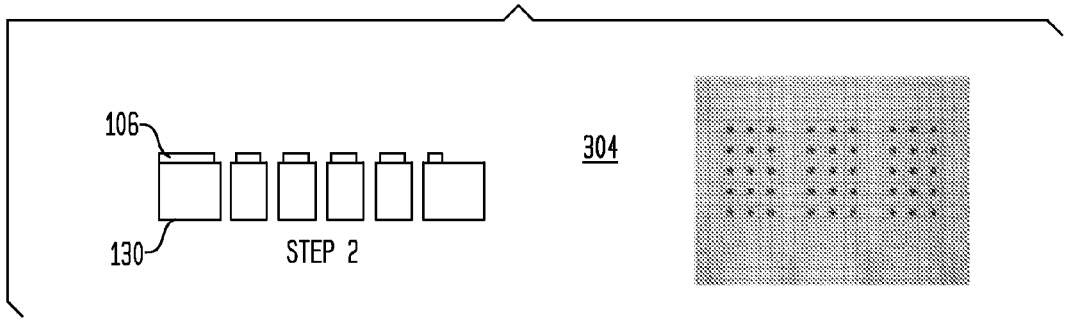

The second step 304 in this one embodiment of the fabrication process flow 300 for manufacturing a pressure sensor 100 is depicted in FIG. 3b. The second step 304 in the one embodiment of the fabrication process flow 300 is to create the bottom electrode 106. The bottom electrode 106 in the embodiment depicted is screen printed on the substrate 130 using screen printing techniques known to those of ordinary skill in the art. After the thick-film is screen printed on the substrate 130 to form the bottom electrode 106, the substrate 130 with thick-film is fired to cure the bottom electrode 106 to achieve the desired mechanical, electrical and thermal properties.

Figure 10:
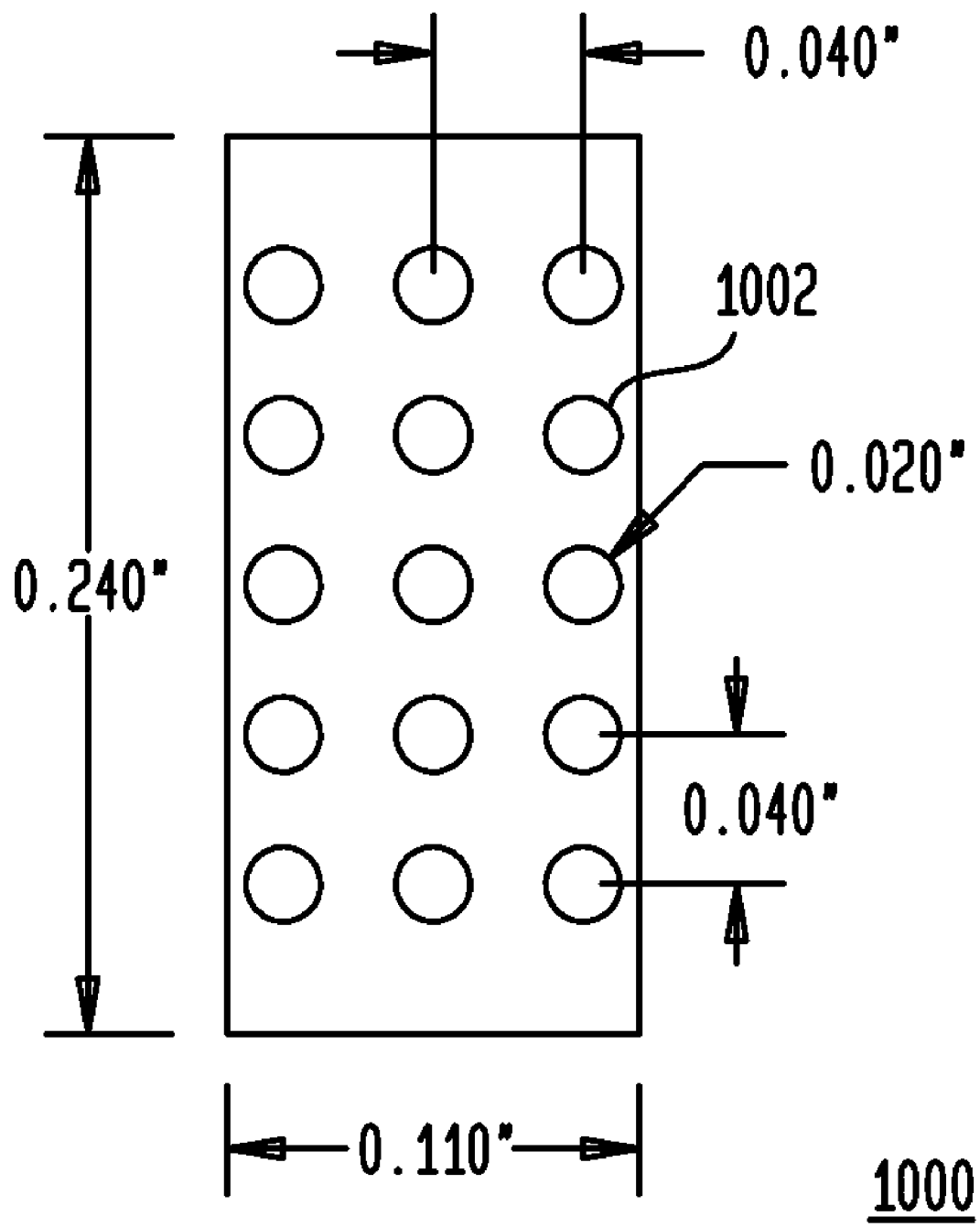
FIG. 10 is a planar view of the bottom electrode mask for an embodiment of a ceramic pressure sensor.

FIG. 10 depicts an exemplary embodiment of a bottom electrode 106 screen print mask 1000 used in the second step 304 of one embodiment of the fabrication process flow 300 for manufacturing a pressure sensor 100 as shown in FIG. 3b. The bottom electrode mask 1000 shown in FIG. 10 is adapted such that when the an edge of the bottom electrode mask 1000 is substantially aligned with one edge of the substrate 130, the bottom electrode mask 1000 will protect the vias 118 from the thick-film coating. In the embodiment depicted in FIG. 10, the via hole relief 1002 (see FIG. 10) for each of the vias 118 about 0.020" in diameter. The length of the embodiment depicted in FIG. 10 is about 0.240". The width of the embodiment depicted in FIG. 10 is about 0.110". The bottom electrode mask 1000 is fabricated using techniques known to those of ordinary skill in the art in thick-film screen printing based on the tolerances and capabilities of the equipment used, characteristics of the substrate 130, and of the thick-film itself.

Figure 4B:
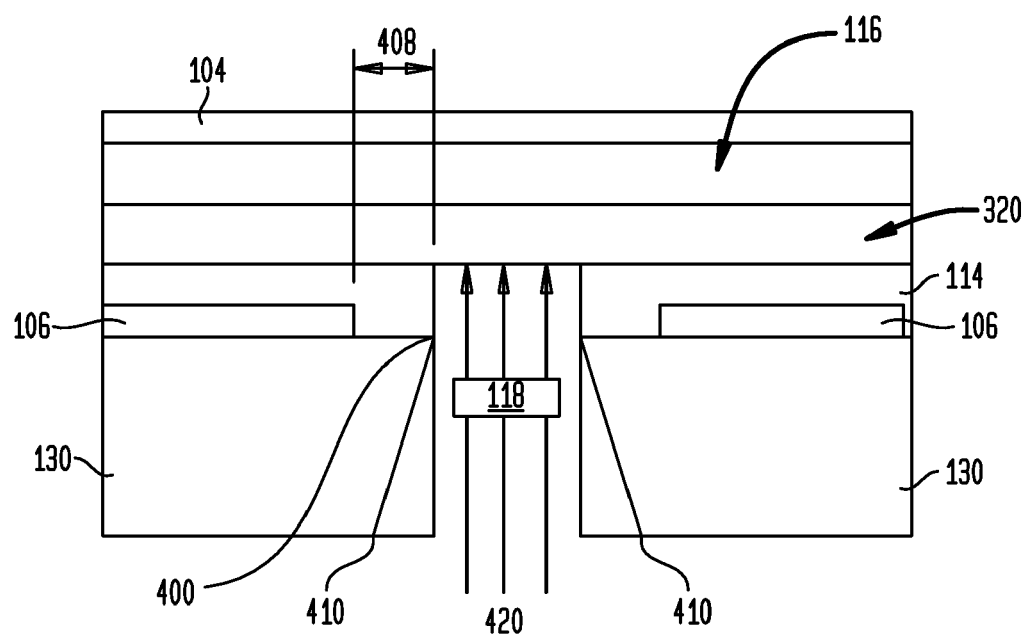
FIG. 4b depicts the nominal flow of chemical etchant relative to an embodiment of a single via from the exemplary process flow shown in FIGS. 3a-g.
Figure 5:
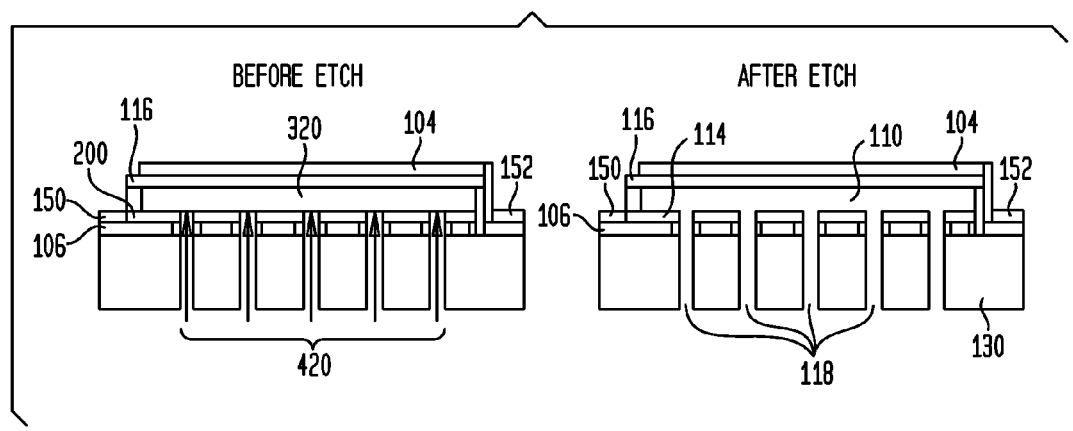
FIG. 5 depicts cross-sectional views of an embodiment of a ceramic pressure sensor before and after chemical etching.

The via hole relief 1002, or setback, for each of the vias 118 limits the extents deposited bottom electrode 106 material to keep it away from the edge of the top aperture 400. Specifically a setback distance 408, shown in FIG. 4b, provides a relief between the via 118 and the closest deposition of the bottom electrode 106. The setback distance 408 in one embodiment is about 0.005". In another embodiment, the setback distance 408 is about 0.010". In the case of an embodiment with a substantially circular first aperture 400 with a diameter of 0.010", the setback distance 408 is a substantially circular diameter of about 0.020" centered around the via 118 resulting in a setback distance 408 of about 0.005".

The bottom electrode 106 can be fabricated from a number of different materials known to those of ordinary skill in the art. For example, in one embodiment a thick-film gold composition is used to create the bottom electrode 106. The thick-film gold composition in still another embodiment is selected from the list of commercially available gold compositions comprised of DuPont® thick film gold compositions numbers 5771, 4597, QG150, 5715, 5725A, 4596, 5775, 5760 and 5989. The thick-film gold composition in still another embodiment is selected from the list of commercially available gold compositions comprised of Heraeus® thick film gold compositions numbers C5755, C5755A, C5756, C5789 and KQ550. The thick-film gold composition in still another embodiment is selected from the list of commercially available gold compositions comprised of Electro-Science Laboratories® thick film gold compositions numbers 8836, 8844, and 8881. In another embodiment, a thick-film silver composition is used to create the bottom electrode 106. The thick-film silver composition in still another embodiment is selected from the list of commercially available silver compositions comprised of DuPont® thick film silver composition numbers 6160, QM14, QM17, QM18, QM22, QM24, and QM25. The thick-film silver composition in still another embodiment is selected from the list of commercially available silver compositions comprised of Heraeus® thick film silver composition numbers C4003, C1075, and C1076SD. The thick-film silver composition in still another embodiment is selected from the list of commercially available silver compositions comprised of Electro-Science Laboratories® thick film silver composition numbers 9695, 9633-G, and 9633-B.

In addition to the thick-film screen process shown other embodiments embrace different approaches for depositing the bottom electrode 106 on the substrate 130. For example, one embodiment utilizes photolithography techniques to precisely pattern the deposited thick-film material in order to achieve greater dimensional control. In still another embodiment, a chemical vapor deposition process is used to deposit a conductive metal on the substrate 130, which is then patterned to form the desired bottom electrode 106. In yet another embodiment, a physical vapor deposition process is used to deposit a conductive metal on the substrate 130, which is then patterned to form the desired bottom electrode 106. In yet another embodiment a sputter deposition process is used to deposit a conductive metal on the substrate 130, which is then patterned to form the desired bottom electrode 106.

Step Three

Figure 3C:
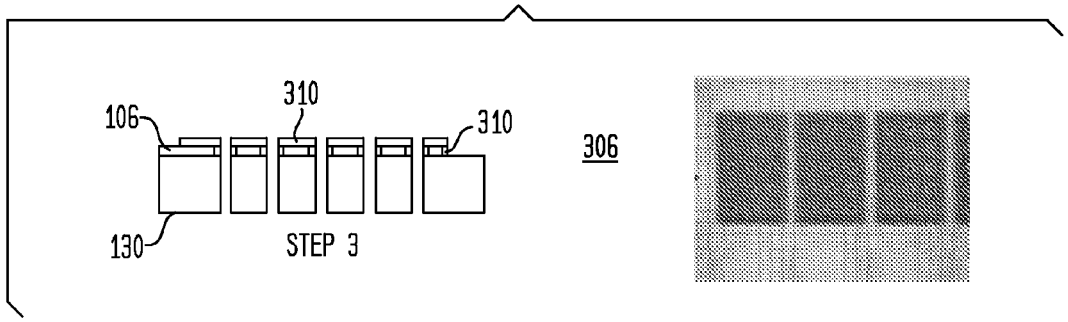

The third step 306 in this one embodiment of the fabrication process flow 300 for manufacturing a pressure sensor 100, depicted in FIG. 3c, is used to fabricate the diaphragm bottom surface 114. The diaphragm bottom surface 114 is screen printed on both the substrate 130 and the bottom electrode 106. The diaphragm bottom surface 114 is a dielectric material that is also applied using thick-film screen printing techniques known to those of ordinary skill in the art. After the diaphragm bottom surface 114 dielectric is applied to the die 902, the thick-film is fired to cure the dielectric to achieve the desired mechanical, electrical and thermal properties.

Figure 11:
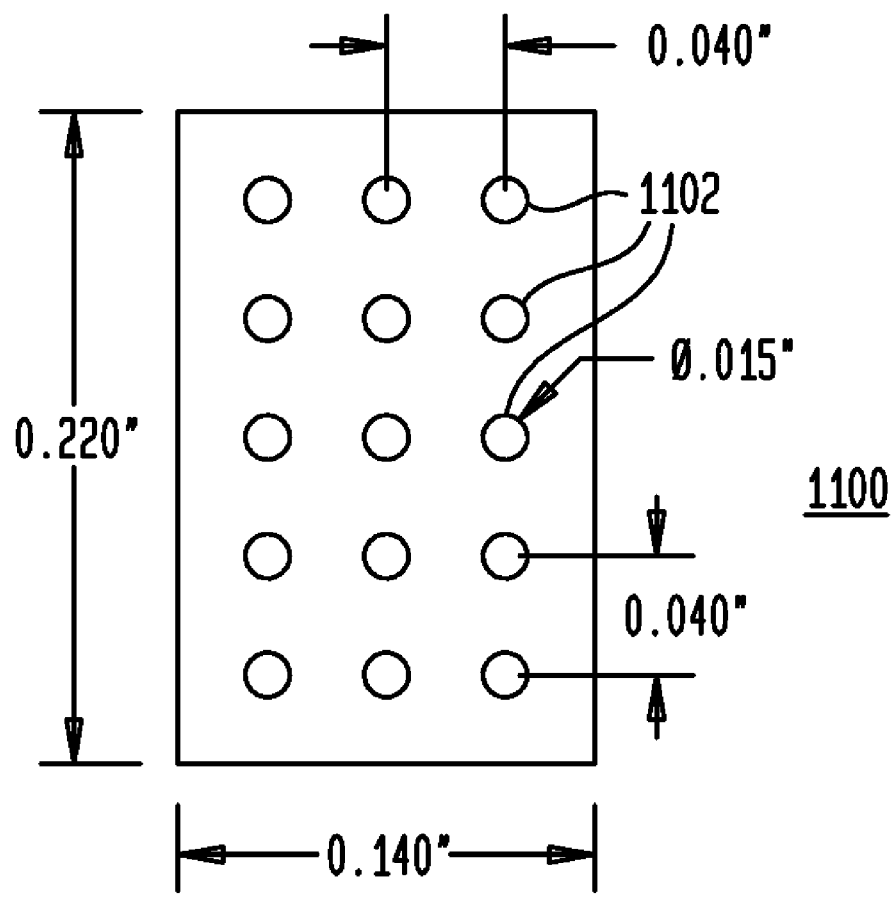
FIG. 11 is a planar view of the bottom dielectric mask for an embodiment of a ceramic pressure sensor.

FIG. 11 depicts an exemplary embodiment of a bottom diaphragm surface 114 bottom dielectric mask 1100 used in the third step 306 of one embodiment of the fabrication process flow 300 for manufacturing a pressure sensor 100 as shown in FIG. 3c. The bottom dielectric mask 1100 shown in FIG. 11 is adapted such that when the dielectric hole pattern 1102 is substantially aligned with the vias 118 on the substrate 130 the dielectric overlaps portions of the bottom electrode 106 and touches the substrate 130. The length of the embodiment depicted in FIG. 11 is about 0.220". The width of the embodiment depicted in FIG. 11 is about 0.140". Specifically, the diameter of the dielectric hole pattern 1102 in the embodiment shown is about 0.015", or about 0.005" undersized compared to the same hole relief 1002 used for the bottom electrode 106. Also, the bottom dielectric mask 1100 is slightly oversized on the left and right edges of the dielectric when applied resulting in the thick-film process filling over the bottom electrodes and forming a covering cap 310 over the bottom electrode 106 as shown in FIG. 3c. The covering cap 310 protects the bottom electrode 106 from etchant flowing through the vias 118 later in this one embodiment of the process flow 300, protects the bottom electrode 106 from the environment, and also electrically isolates the bottom electrode 106 from the top electrode 104 which is applied later in this one embodiment of the process flow 300.

The bottom diaphragm surface 114 is fabricated in a first embodiment from a number of different thick-film dielectric materials known to those of ordinary skill in the art. The thick-film dielectric composition in still another embodiment is selected from the list of commercially available dielectric compositions comprised of DuPont® dielectric film compositions numbers QM44, 5704 and 9615. The QM44 thick-film dielectric is a crystallizable dielectric with high resistance to battery EMF effects such as mixed metal high temperature blistering and migration. The 9615 thick-film dielectric is a clear dielectric composition that when used in an embodiment, permits visual monitoring of the chemical etching progress to provide greater control over the removal of the sacrificial layer 320. The thick-film dielectric composition in still another embodiment is selected from the list of commercially available dielectric compositions comprised of Heraeus® dielectric film compositions numbers IP 9117 D and IP 9217. The thick-film dielectric composition in still another embodiment is selected from the list of commercially available dielectric compositions comprised of Electro-Science Laboratories® dielectric film compositions numbers 4905-C, 4905-CH and 4917.

The paste 1508 that is used to create the diaphragm 102 is a dielectric ink consisting of glass powders, refractory powders, and printing vehicles. The glass powders provide adhesion to the substrate, a dense cohesive film, and encapsulation. The refractory powders provide structure to the films at high temperature and impart color. The print vehicles impart screen-printing properties, produce the required drying rate and supply binding properties during the drying and firing processes.

The most widely used glass powders are lead borosilicate, bismuth silicate, and aluminosilicate glasses. Typical lead borosilicate glass composition is 63% lead oxide, 25% boron oxide, and 12% silicon dioxide.

The refractory powders used in dielectric pastes are composed of one or more metal oxides and glass. Typical metal oxides used are oxides of aluminum, calcium, zirconium, zinc, barium, silicon, and phosphorous.

The printing vehicles consist of a volatile solvent or thinner and a nonvolatile temporary binder. Organic solvents and thinners are used to disperse the solid ingredients and adjust the ink viscosity. Typical solvents and thinners used are pine oil, butyl acetate, terpineol, isomers of terpineol, and butyl esters. Temporary binders are organic compounds and polymers used to provide printing properties and temporary adhesion of the film to the substrate during printing, drying, and firing. Ethyl cellulose, cellulose ethers, sodium alginate, sodium carboxylmethyl cellulose, polysaccharide, polyethylene glycol, polyvinyl alcohol, and polyvinyl acetate are examples of some temporary binders that are typically used. During the screen print process 1500, the screen print vehicles are removed from the green features or uncured features during the drying and firing process.

Step Four

Figure 3D:
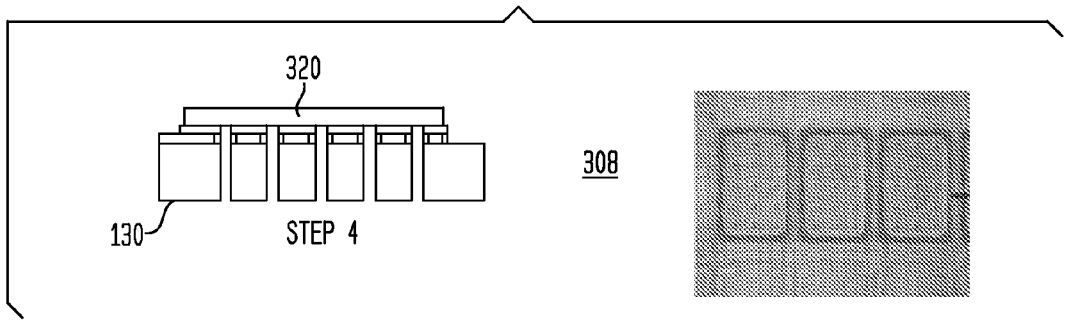

The fourth step 308 in this one embodiment of the fabrication process flow 300 for manufacturing a pressure sensor pressure sensor 100, depicted in FIG. 3*d*, is used to fabricate the sacrificial layer 320. The sacrificial layer 320 is used to define the size of the cavity 110 of the diaphragm 102 that is formed later in the process flow when the sacrificial layer 320 is removed using an etchant. The sacrificial layer 320 is also applied using thick-film screen printing techniques known to those of ordinary skill in the art. After the sacrificial layer 320 is applied, the thick-film is fired to cure the sacrificial layer 320 to achieve the desired mechanical, electrical and thermal properties.

Figure 12A:
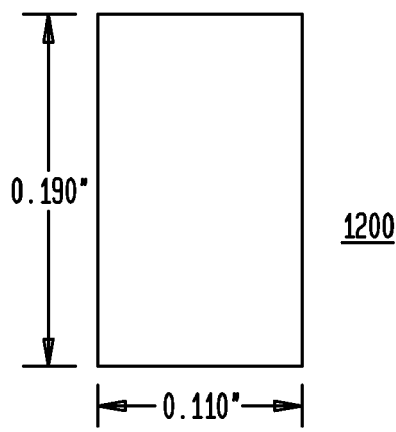
FIG. 12 depicts planar views of the sacrificial layer mask (FIG. 12a), top dielectric mask (FIG. 12b), and top electrode mask (FIG. 12c) of an embodiment of a ceramic pressure sensor.

FIG. 12*a* depicts an exemplary embodiment of a sacrificial layer mask 1200 used in the fourth step 308 of one embodiment of the fabrication process flow 300 for manufacturing a pressure sensor 100 as shown in FIG. 3*d*. The sacrificial layer 320 mask 1200 shown in FIG. 12*a* is sized to fit within the outer extents of the diaphragm bottom surface 114 with no overlap. In the embodiment depicted in FIG. 12*a*, the sacrificial layer mask 1200 is about 0.190" long by 0.110" wide. During the process 300 the sacrificial layer mask 1200 is substantially aligned with the center point of the via 118 hole pattern on the substrate 130 and the dielectric hole pattern 1102 such that all vias 118 that emerge through the diaphragm bottom surface 114 are substantially covered. The thickness of the as applied sacrificial layer 320 defines the overall cavity height (dA) and the extents of the sacrificial layer 320 define the bounds of the cavity 110 that is formed during the etching process later in one embodiment of the fabrication process flow 300.

The sacrificial layer 320 is fabricated in a first embodiment from a number of different etchable thick-film gold materials known to those of ordinary skill in the art. The thick-film etchable gold material in still another embodiment is selected from the list of commercially available etchable gold compositions comprised of DuPont® etchable gold composition number QG150. The thick-film etchable gold material in still another embodiment is selected from the list of commercially available etchable gold compositions comprised of Heraeus® etchable gold composition number KQ550. The thick-film etchable gold material in still another embodiment is selected from the list of commercially available etchable gold compositions comprised of Electro-Science Laboratories® etchable gold composition numbers 8881-B, 8886, and 8886-A.

In yet another embodiment, the sacrificial layer 320 is fabricated from a number of different etchable thick-film silver materials known to those of ordinary skill in the art. The thick-film etchable silver material in still another embodiment is selected from the list of commercially available etchable silver compositions comprised of Heraeus® etchable silver composition number KQ610A.

In yet another embodiment, the sacrificial layer 320 is fabricated from a number of different thick-film conductor materials consisting of gold, platinum, palladium, silver, copper, ruthenium and alloys of these conductor materials known to those of ordinary skill in the art.

The sacrificial layer 320 in still another embodiment is selected from thick-film conductor materials consisting of gold, platinum, palladium, silver, copper, ruthenium and alloys of these conductor materials commercially available from DuPont®, Heraeus®, and Electro-Science Laboratories.

In addition to the thick-film screen process shown, other embodiments embrace different approaches for depositing the sacrificial layer 320 on the diaphragm bottom surface 114. For example, one embodiment utilizes photolithography techniques to precisely pattern the deposited thick-film material in order to achieve greater dimensional control. In still another embodiment, a chemical vapor deposition process is used to deposit a conductive metal on the diaphragm bottom surface 114, which is then patterned to form the desired sacrificial layer 320. In yet another embodiment, a physical vapor deposition process is used to deposit a conductive metal on the diaphragm bottom surface 114, which is then patterned to form the desired sacrificial layer 320. In yet another embodiment, a sputter deposition process is used to deposit a conductive metal on the diaphragm bottom surface 114, which is then patterned to form the desired sacrificial layer 320.

Step Five

Figure 3E:
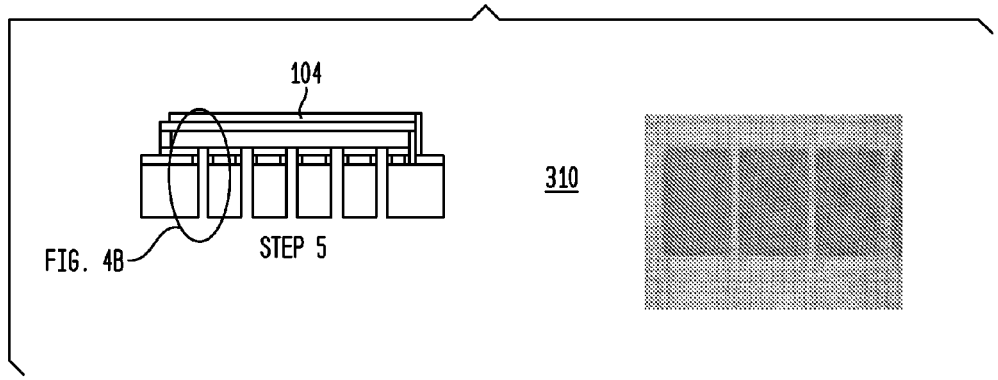

The fifth step 310 in this one embodiment of the fabrication process flow 300 for manufacturing a pressure sensor 100 is depicted in FIG. 3*e* and is used to fabricate the diaphragm walls 108 and the diaphragm top surface 116. The diaphragm walls 108 and the diaphragm top surface 116 are formed on top and around the sacrificial layer 320. The diaphragm walls 108 abut the diaphragm bottom surface 114. Together the diaphragm 102, comprised of the diaphragm walls 108, the diaphragm bottom surface 114 and the diaphragm top surface 116 surround the sacrificial layer 320 and once the sacrificial layer 320 is removed in Step Eight below, define the cavity 110. The diaphragm walls 108 and diaphragm top surface 116 are formed of the same dielectric materials used to fabricate the diaphragm bottom surface 114 above using similar thick-film screen printing techniques known to those of ordinary skill in the art. After the thick-film is applied to form the diaphragm walls 108 and the diaphragm top surface 116, the applied thick-film is fired to achieve the desired mechanical, electrical and thermal properties.

Figure 12B:
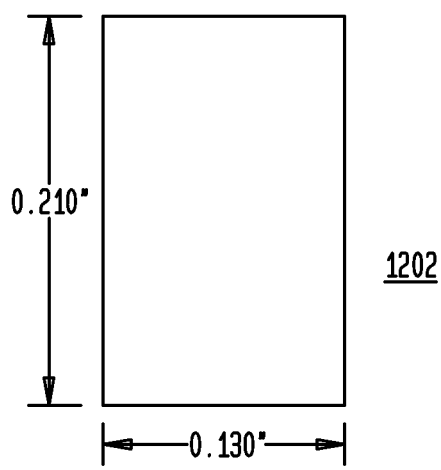

FIG. 12b depicts an example embodiment of the top dielectric screen print mask 1202 used to form the diaphragm walls 108 and the diaphragm top surface 116. The top dielectric screen print mask 1202 is adapted to overlap all sides of the sacrificial layer 320 thereby ensuring the thick-film dielectric when applied surrounds the sacrificial layer 320. In the embodiment depicted in FIG. 12b, the top dielectric screen print mask 1202 is about 0.130" wide by 0.210" long.

The thickness of the diaphragm top surface 116 of the pressure sensor 100 partially impacts the sensitivity of the pressure sensor 100 to a given external pressure 190. Specifically, the thicker the diaphragm top surface 116 of the pressure sensor 100 the greater the rigidity. A more rigid diaphragm top surface 116 will deflect less due to an applied external pressure 190 that creates a pressure differential with the fluid contained within the cavity 110. Thus the sensitivity of the pressure sensor 100 to various changes in external pressure 190 can be adjusted by adjusting the thickness of the diaphragm top surface 116. In other embodiments, the sensitivity or response of the pressure sensor 100 is adjusted by selecting alternative dielectric materials that comprise the diaphragm top surface 116, which have different stiffness properties in the as fired state. The stiffness properties of a given dielectric material used for the diaphragm top surface 116 are related to the elastic modulus of the fired dielectric material that comprises the top diaphragm surface 116. The effective flexural rigidity (D) of the diaphragm top surface 116 is given by Equation [1].

$$D = Eh^3/[12(1-v^2)] \quad [1]$$

Where E is the Young's modulus and v is the Poisson's ratio for the diaphragm top surface 116 and h is the thickness of the diaphragm top surface 116. Thus, changes in any of these parameters modulates the effective flexural rigidity of the diaphragm top surface 116 and thus affects the deflection of the diaphragm top surface 116 in response to a given external pressure 190 as well as thus modulates the response of the pressure sensor 100 by varying the distance between the top electrode 104 and the bottom electrode 106.

In other embodiments, structural elements are constructed in the diaphragm top surface 116 by patterning molding features in the sacrificial layer 320. These structural elements affect the stiffness of the diaphragm top surface 116 and the sensitivity of the pressure sensor 100 to various changes in external pressure 190.

In still other embodiments the fluid captured within the cavity 110 adjust the response of the pressure sensor 100 to an external pressure 190. The cavity 110 in one embodiment of the pressure sensor 100 is vented through the vias 118 to allow the fluid medium, including gases, present at the bottom aperture of the vias 118 to fill the cavity 110 to create a differential pressure measurement. In a second embodiment, the vias 118 are sealed with a sealing dielectric 120 to seals inside the cavity 110 a fluid, including a gas, at a specific pressure ranging from vacuum pressures to pressures greater than atmospheric.

Overall dynamic pressure range is controlled in this embodiment by manipulating several variables. Specifically, in response to the differential pressure created between the pressure of the fluid contained within the cavity 110 and the external pressure 190, the diaphragm top surface 116 will deflect in response to the differential pressure across the diaphragm top surface 116. In one embodiment, the amount of deflection of the diaphragm top surface 116 in response to a given applied external pressure 190 is modulated by adjusting the materials properties of the dielectric material that is applied using the thick-film screen printing process to form the diaphragm top surface 116, and more specifically the selection of dielectric materials with different elastic modulus properties. In another embodiment, the thickness of the dielectric is used to modulate the response of the diaphragm top surface 116 to the differential pressure across the diaphragm top surface 116. In still another embodiment, the overall shape of the diaphragm top surface 116 is selected to effectively minimize or maximize the amount of deflection in response to a given differential pressure. In another embodiment, the structural elements are created in the diaphragm top surface 116 to effectively minimize or maximize the amount of deflection in response to a given differential pressure. In yet another embodiment, the amount of deflection in the diaphragm top surface 116 is modulated by increasing pressure of the fluid contained within the cavity 110. The increase in fluid pressure contained within the cavity 110 acts as an offset to the external pressure 190 in that prior to deflecting the diaphragm top surface 116 the external pressure 190 must be greater than the fluid pressure contained within the cavity 110 before the top diaphragm surface 116 begins to be deflected inward. In all of these embodiments, the ability of the diaphragm top surface 116 to survive a given external pressure 190 is based on the amount of deflection the different pressure causes in the diaphragm top surface 116. Specifically, as the diaphragm top surface 116 is deflected inward into the cavity 110 and toward the diaphragm bottom surface 114 specific stresses are imparted on the deflected diaphragm top surface 116. These imparted stressed substantially dictate the longevity of the diaphragm top surface 116 in response to a specific cyclical loading due to oscillating external pressure 190. In the case of static or burst pressure, the imparted stresses on the deflected diaphragm top surface 116 dictate the maximum external pressure 190 that a given pressure sensor 100 can survive. In one embodiment, careful selection of the cavity 110 height (dA) allows the diaphragm top surface 116 to come in contact with the diaphragm bottom surface 114, thereby creating a mechanical stop to avoid bursting the diaphragm 102.

When selecting a specific diaphragm top surface 116 thickness and materials, the effect of the etchant must be considered in addition to sensitivity and survival. Specifically, the diaphragm top surface 116 must survive exposure to the etchant for the amount of time necessary for removal of the sacrificial layer 320 without allowing the etchant to penetrate through and attack the top electrode 104 nor cause the diaphragm top surface 116 to become too thin and thus compromise responsiveness or survivability with respect to an applied external pressure 190.

In still another embodiment, an etch stop layer is added between the diaphragm top surface 116 and the sacrificial layer 320. The etch stop layer is selected to be immune to the etchant solution 420, or more generally the etchant.

Step Six

Figure 3F:
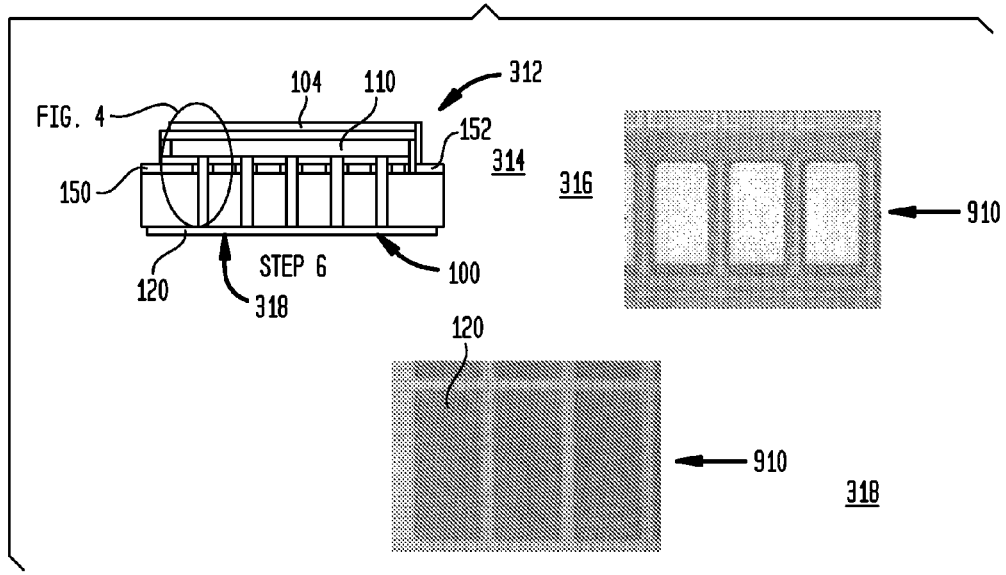

The sixth step 312 in this one embodiment of the fabrication process flow 300 for manufacturing a pressure sensor pressure sensor 100, depicted in FIG. 3f, is used to fabricate the top electrode 104. The top electrode 104 is applied to the diaphragm top surface 116 and over the substrate 130 on the substrate top surface 134 such that a continuous electrical circuit is created between the portion of the top electrode 104 applied to the diaphragm top surface 116, down at least one of the diaphragm walls 108 to the portion of the top electrode 104 mounted on a portion of the substrate top surface 134. The top electrode 104 is formed on the substrate 130 in the embodiment depicted using the same thick film materials used to fabricate the bottom electrode layer 106 described above using thick-film screen printing techniques known to those of ordinary skill in the art. After the thick-film is screen printed on the substrate 130 and the diaphragm top surface 116 to form the top electrode 104, the substrate with thick-film is fired to cure the top electrode 104 to achieve the desired mechanical, electrical and thermal properties.

Figure 12C:
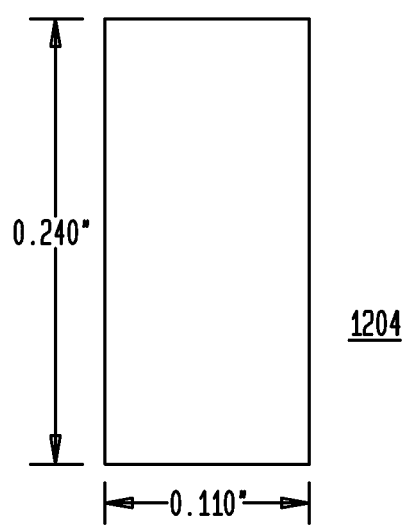

FIG. 12c depicts an exemplary embodiment of a top electrode screen print mask 1204 used in the sixth step 312 of one embodiment of the fabrication process flow 300 for manufacturing a pressure sensor 100 as shown in FIG. 3f. The top electrode mask 1204 shown in FIG. 12c is adapted such that when the edge is substantially aligned with one edge of the substrate 130, the top electrode mask 1204 covers a portion of the diaphragm top surface 116 and extends beyond at least one portion of an edge to the substrate 130. In the embodiment depicted in FIG. 12c, the screen print mask 1204 is about 0.110" wide by 0.240" long. The overall extends of the top electrode screen print mask 1204 is determined by those of ordinary skill in the art of thick-film screen printing based on the tolerances and capabilities of the equipment used, desired characteristics of the top electrode 104, and of the thick-film itself.

Step Seven

The seventh step 314 in this one embodiment of the fabrication process flow 300 for manufacturing a pressure sensor 100 is partially depicted in FIG. 3f. The seventh step 314 in the one embodiment of the fabrication process flow 300 is used to deposit the top electrode termination 152 and the bottom electrode termination 150. The respective metallization is used to create a suitable connector to enable bonding of electrical signal wires to the packaging input and output connections. Wirebondable/weldable termination metallizations such as gold and silver and solderable/brazeable termination metallizations such as platinum gold, platinum silver, and palladium silver are applied by thick film screen printing. The thick-film wirebondable/weldable materials in one embodiment is selected from the list described in the second step 304 above. The thick-film solderable/brazeable materials in another embodiment is selected from the list of commercially available solderable compositions comprised of DuPont® solderable conductor composition numbers 4597, 4596, 9596, QM22, QM24, and QM25. In another embodiment, the thick-film solderable materials is selected from the list of commercially available solderable compositions comprised of Heraeus® solderable conductor composition numbers C4003, C4131S, and C1076SD. In yet another embodiment, the thick-film solderable materials is selected from the list of commercially available solderable compositions comprised of Electro-Science Laboratories® solderable conductor composition numbers 9633-G, 9633-B, 5837, and 9695. Interconnecting the signal wires utilizing welding and high temperature brazing are best suited for harsh environment applications such that the interconnect alloy does not undergo reflow at the application temperature.

Figure 13A:
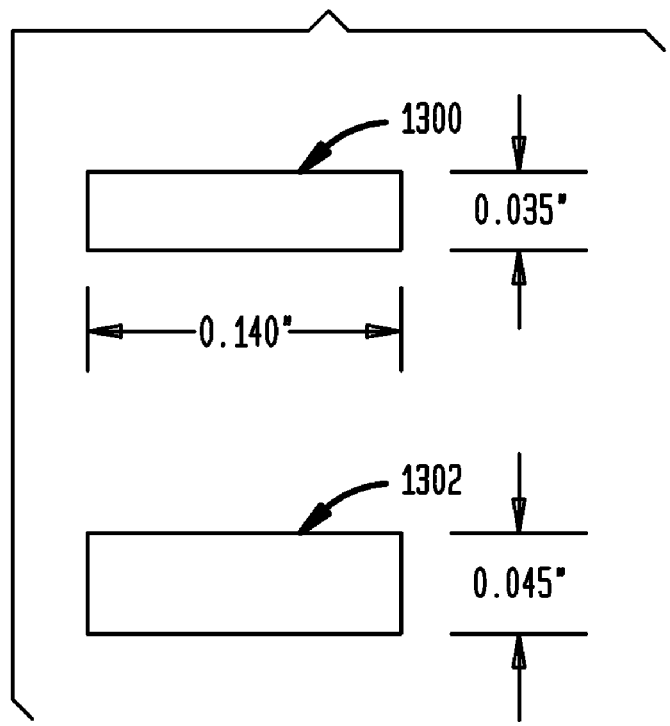
FIG. 13 depicts planar views of termination mask (FIG. 13a) and termination dielectric mask (FIG. 13b) of an embodiment of a ceramic pressure sensor.

FIG. 13a depicts an exemplary embodiment of a top electrode termination mask 1302 and bottom electrode termination mask 1300 used in the seventh step 314 of one embodiment of the fabrication process flow 300 for manufacturing a pressure sensor 100 as shown in FIG. 3e. The top electrode termination 152 and the bottom electrode termination 150 are fabricated using a screen print process with a top electrode termination mask 1302 and a bottom electrode termination mask 1300. The bottom electrode termination mask 1300 in this embodiment is sized to be deposited on the pressure sensor 100 and interface with the exposed portion of the bottom electrode 106 and in the embodiment depicted is about 0.140" wide×about 0.035" tall. The top electrode termination mask 1302 in the embodiment shown is about 0.140" wide×about 0.045" tall. The additional height of the top electrode termination mask 1302 is an overlap to cover the step portion of the top electrode 104 that transitions from the diaphragm 102 to the portion of the top electrode 104 in contact with the substrate 130.

Figure 13B:
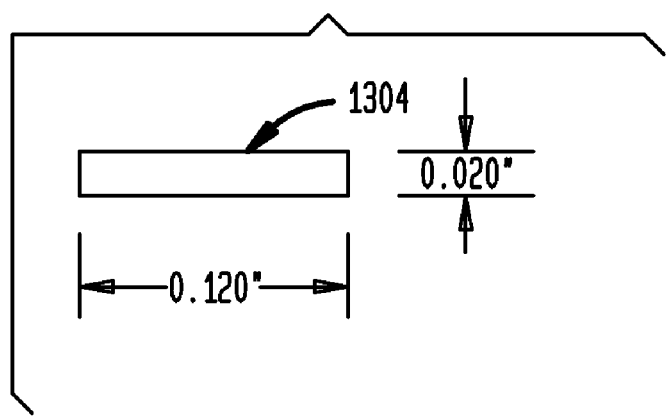

Subsequent to screen-printing the top electrode termination 152 and the bottom electrode termination 150, a termination dielectric layer 1304 is screen-printed to cover the step partition transition from the top electrode 104 and the top electrode termination 152. This is necessary to prevent leaching of the top electrode 104 into any solder or braze materials used to attach interconnect wires to the sensor 100. The termination dielectric mask 1304 is shown in FIG. 13b and in this embodiment is sized to be deposited on the pressure sensor 100 and in the embodiment depicted is 0.120" wide× 0.020" tall. The dielectric materials used in the seventh step 314 are selected from the same options described in the third step 306 above.

Step Eight

Figure 3G:
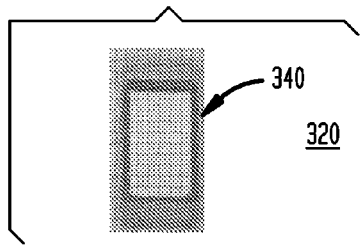

The eighth step 316 in the this one embodiment of the fabrication process flow 300 for manufacturing a pressure sensor 100 is depicted in FIG. 3f and FIG. 3g. The eighth step 316 in the fabrication process flow 300 is used to remove the sacrificial layer 320 and form the cavity 110 in the diaphragm 102, as detailed in FIG. 4a and FIG. 4b. During the process, the vias 118 form a passage between the substrate bottom surface 132 and the cavity 110 formed by the removal of the sacrificial layer 320.

The eighth step 314 in this one embodiment of the fabrication process flow 300 uses a combination of a chemical etchant solution or etchant 420 and physical stimuli to improve the etching of the sacrificial layer 320 via etchant 420 admitted through the vias 118 while limiting the impact on the remaining pressure sensor 100 structure. In one embodiment, the chemical etchant solution 420 comprising a potassium iodide bath is used. In one embodiment for gold sacrificial layers 320, the chemical etchant solution 420 comprising a potassium iodide bath is used. The potassium iodide bath is a mixture of 400 grams of potassium iodide, 100 grams of iodine, and 400 milliliters of deionized water. In another embodiment for a gold sacrificial layer 320, the chemical etchant solution 420 is comprised of three parts hydrochloric acid to 1 part nitric acid. In yet another embodiment for a gold sacrificial layer 320, the chemical etchant solution 420 can be comprised of potassium cyanide and hydrogen peroxide. In yet another embodiment for gold sacrificial layer 320, the chemical etchant solution 420 is comprised of a ferric chloride and hydrochloric acid. In one embodiment for silver sacrificial layer 320, the chemical etchant solution 420 comprising a 5 part nitric acid to one part deionized water is used. In another embodiment for silver sacrificial layers, the chemical etchant solution can be comprised of ferric nitrate and ethylene glycol. In one embodiment for copper sacrificial layer 320, the chemical etchant solution 420 comprising a 25 grams ferric chloride to 500 milliliters water solution is used.

The action of the chemical etchant solution 420 is increased by placing the entire bath in a heated ultrasonic tank. The heated ultrasonic tank imparted both ultrasonic vibrations to the bath, and by default the etchant 420, and also raised the temperature of the etchant bath. In one embodiment, the ultrasonic frequency is maintained between about 40 and about 50 kHz. In another embodiment, the ultrasonic frequency is maintained to about 47 kHz. In one embodiment, the temperature of the etchant bath is maintained between about 40 C and 60 C. In still another embodiment, the temperature of the etchant bath was maintained to about 50 C. The etching of the sacrificial layer 320 is maintained until the sacrificial layer 320 is substantially removed from within the diaphragm 102, resulting in a substantially clearing the cavity 110 thereby causing the diaphragm 102 to be released such that the diaphragm top surface 116 is free to deflect in response to a pressure differential between the pressure within the cavity 110 and the external pressure 190.

In one embodiment the etch time is established by visually monitoring the etching of the sacrificial layer 320 of die 902 fabricated with a clear dielectric diaphragm 102. The time that it took to completely remove the sacrificial layer 230 from these die 902 with a clear dielectric diaphragm 102 is then used on the real devices. In still another embodiment, X-Ray imaging is used to determine if the sacrificial layer 320 is sufficiently removed. In another embodiment, monitoring devices with a clear dielectric diaphragm 102 are etched at the same time, using the same solution and bath as real devices. Etching on the real devices is stopped when the sacrificial layer 320 was removed from the monitoring devices. In yet another embodiment, device cross-sections are created on set-up devices after increasing etch times until it was determined that the sacrificial layer 320 is sufficiently removed. This etch time is then used on the real devices. In one embodiment of the process, prior to etching, a photoresist is spun onto the top surface of the pressure sensor 100 to protect the top electrode 104, top electrode termination 152, bottom electrode 106, and bottom electrode termination 150 from the chemical etchant bath.

The flow of the etchant 420 into the vias 118 in one embodiment is also impacted by the shape of vias 118. The vias 118, when created using a laser drilling process in one embodiment, posses tapered side walls 410. The side walls 410 result in a slightly oversized bottom aperture 402 on the substrate bottom surface 132 when compared to the desired top aperture 400 on the substrate top surface 134. When the substrate 130 is oriented correctly, the side walls 410 serves to direct and guide the flow of the etchant 420 into contact with the sacrificial layer 320. In one embodiment, the taper in the side walls 410 is about 45 degrees. In still another embodiment, the taper in the side walls 410 results in a top aperture 400 of 0.010" diameter and a bottom aperture 402 of 0.015" through a 0.025" thick substrate 130.

The sacrificial layer 320 is removed by a chemical reaction between the chemical etchant solution 420 and sacrificial layer 320 material which results in the sacrificial layer 320 material transforming or dissolving into a solid solution in the etchant 420 liquid and flowing out of the vias 118 through the bottom aperture 402. After the sacrificial layer 320 is etched away, the photoresist is removed using photoresist remover or acetone.

Step Nine

The ninth step 318 in this one embodiment of the fabrication process flow 300 for manufacturing a pressure sensor pressure sensor 100, depicted in FIG. 3f, is used to deposit the sealing dielectric 120 on the substrate bottom surface 132 using a thick-film screen print process, thereby sealing the vias 118 to the cavity 110 and creating a seal to hold a fluid at a desired internal pressure within the cavity 110. By creating and sealing a fluid at a known pressure inside the cavity 110 it is possible to create a gauge or absolute pressure sensor pressure sensor 100 that measures the external pressure 190 relative to a reference pressure rather than a differential measurement. The dielectric materials used in the ninth step 318 are selected from the same options described in the third step 306 above.

Figure 14:
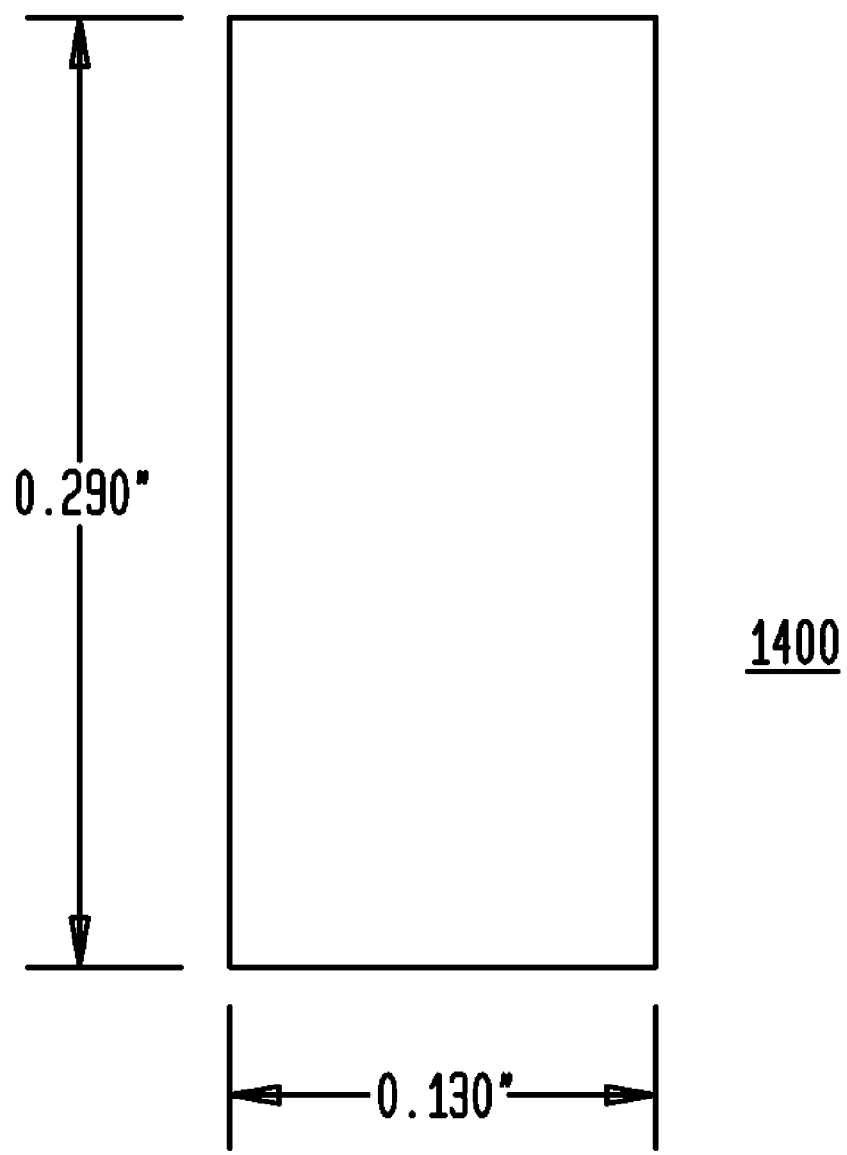
FIG. 14 depicts a planar view of the backside dielectric mask of an embodiment of a ceramic pressure sensor.

FIG. 14 details an exemplary embodiment of a sealing mask 1400 used in the ninth step 318 of one embodiment of the fabrication process flow 300 for manufacturing a pressure sensor 100 as shown in FIG. 3f. The sealing mask 1400 is adapted to cover all of the vias 118 found in the substrate 130. In the embodiment shown in FIG. 14, the sealing mask 1400 is about 0.29" long by 0.13" wide. In an alternative embodiment, the sealing mask 1400 is adapted to create a sealing dielectric 120 that substantially covers the entire substrate bottom surface 132.

In order to establish a given reference pressure within the sealed cavity 110, the entire sealing operation of the ninth step 318 in one embodiment is conducted in a pressure controlled environment. In one embodiment, the sealing operation of the ninth step 318, is conducted in a pressure controlled environment filled with an inert gas such that the inert gas is retained within the cavity 110 and pressurized the cavity 110. In another embodiment, the pressure controlled environment is filled with dry nitrogen.

Figure 6:
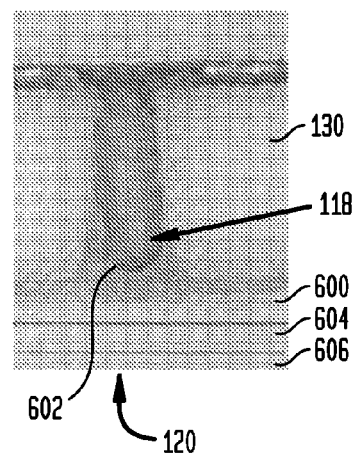
FIG. 6 is a cross-sectional view of an embodiment of a ceramic pressure sensor highlighting the interface between the sealing dielectric and vias.

The screen-print process for laying down the sealing dielectric 120 is critical for establishing a hermetic seal over the vias 118 and the cavity 110. The squeegee process for screen-printing the sealing dielectric 120 is adapted to force a portion of a dielectric ink or paste 1508 down into the vias 118 to create a via fill 602 structure. FIG. 6 details the via fill 602 of the sealing dielectric 120 that is forced into the via 118 by this first process step. The via fill 602 structure is a portion of the sealing layer 120 that is within the extents of the via 118 and beyond the bottom aperture 402. After the first layer 600 of the sealing dielectric 120 is applied to create the via fill 602, the sealing dielectric 120 is fired to cure. After curing, a second application of the sealing dielectric 120 is applied using standard screen printing techniques in order to create a second layer 604 of the sealing dielectric 120. This second layer 604 of the sealing dielectric 120 is then fired to cure. In still another embodiment a third application of the sealing dielectric 120 is applied using standard screen printing techniques in order to create a third layer 606 of the sealing dielectric 120. This third layer 606 of the sealing dielectric is then fired to cure. The use of a first process for create the via fill 602 feature and then multiple application and curing steps is used to create a sealing dielectric 120 to close the vias 118 and seal a reference fluid in the cavity 110.

Performance of Sealing Dielectric

Figure 7:
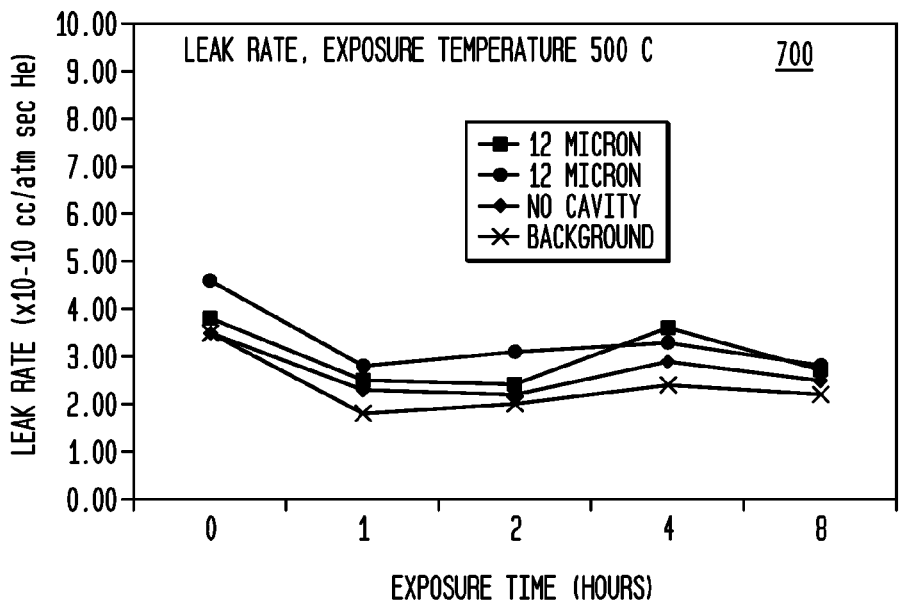
FIG. 7 is a graph detailing hermeticity test results for an embodiment of a ceramic pressure sensor.

Experimental results from an embodiment of the pressure sensor 100 verifying the hermiticity or sealing performance of the sealing dielectric 120 and the diaphragm 102 after exposure to a 500 C environment are shown in chart 700 in FIG. 7. The experimental testing of the embodiment of the pressure sensor 100 was conducted in accordance with MIL-STD 883 Method 1014 Seal Test Condition $A_2$. The experimental results in FIG. 7 demonstrate that the hermiticity of the pressure sensor 100 packaging with two separate embodiments of the cavity 110 height (dA) that an effective seal is established with the screen-print sealing dielectric 120 and diaphragm 102 materials. The maximum measured leak rates limits for the embodiment of the pressure sensor 100 with a cavity 110 height (dA) of 12 μm was $6.9 \times 10^{-10}$ atm-cc/sec and the maximum calculated leak rate limits for the cavity 110 with a height (dA) of 22 μm was $7.0 \times 10^{-10}$ atm-cc/sec at 500 C.

Step Ten

In a first embodiment of the exemplary fabrication process 300 a blank 910 is processed as a whole to enable parallel processing of multiple die 902 in parallel and then they are separated or singulated to create individual devices 340 as shown in FIG. 3f. After processing in parallel the multiple devices contained on blank 910 are sliced into individual devices 340, as shown in FIG. 3g, using one of several techniques. In one embodiment, a diamond dicing saw is used to singulate the dies 902 to create the individual devices 340. In another embodiment, a laser is used to ablate the material between individual die 902 located on the blank 910 in order to singulate them and create the individual devices 340. In yet another embodiment, water jet and abrasive jet machining are used to singulate the die 902 and form the individual devices 340. In still another embodiment the blank 910 is scored and the individual die 902 are singulated to create the individual devices 340 by breaking the blank 910 along the score lines.

Step Eleven

In still another embodiment of the pressure sensor 100 a final coating process is used to create a barrier over the top electrode 104 to protect the electrode from the external environment. Multiple processes may be used to apply a barrier coating, including the use of chemical vapor deposition or physical vapor deposition, to create a thin barrier coating over the surface of the top electrode 104 to protect the electrode from the environment. A number of different coatings, well known to those of ordinary skill in the art are used to create this thin barrier coating, including for example silicon nitride.

Operation of an Embodiment of a Pressure Sensor with Capacitive Transducer

As pressure 190 is applied to the pressure sensor 100, the diaphragm 102 deflects resulting in movement of the portion of the top electrode 104 located on the diaphragm top surface 116. An increase in pressure 190, relative to the pressure of the fluid contained within the cavity 110, results in deflection of the diaphragm top surface 116 toward the diaphragm bottom surface 114. The deflection causes the cavity separation distance or height (dA) to decrease that brings a portion of the top electrode 104 closer to a portion of the bottom electrode 106 thereby increasing the capacitance of the pressure sensor 100 as measured between the top electrode 104 and the bottom electrode 106. The distance of the diaphragm walls 108 extends away from the bottom side 114 defines the height (dA) of the cavity 110, in FIG. 1. Similarly, a decrease in pressure, relative to the pressure of the fluid contained within the cavity 110 results in an upward motion of the top electrode 104 causing the separation distance (dD) between the top electrode 104 and the bottom electrode 106 to increase which results in a decrease in capacitance.

The increase or decrease in capacitance is substantially in accord with the well known Equation [2]:

$$\text{Capacitance } C = \epsilon_o A/dD \quad [2]$$

Where the capacitance (C) is the measured capacitance between the top electrode 104 and the bottom electrode 106. The constant $\epsilon_o$ is the permittivity of the fluid contained in the cavity 110, which in one embodiment is the permittivity of free space in the cavity 110. The variable A is the effective surface area of the top electrode 104 facing the bottom electrode 106 and dD represents the distance between the top electrode 104 and the bottom electrode 106. The estimates provided by Equation [2] are merely to provide an approximation of the change in capacitance for a given deflection of the diaphragm top surface 116 in response to an applied external pressure 190. As such, there are numerous other actual effects, such as localized wall stiffening near the interface of the diaphragm top surface 116 with the diaphragm walls 108, that causes the diaphragm top surface 116 to assume a caternary shape in response to an applied external pressure 190 thereby resulting in a continuously variable distance (dA) between the diaphragm top surface 116 and the diaphragm bottom surface 114.

In one embodiment, the cavity 110 height dA at an equilibrium pressure between the fluid pressure within the cavity 110 and the external pressure 190 is about 22 microns. In another embodiment, the cavity height dA at an equilibrium pressure is about 12 microns. In still another embodiment, the cavity height dA at an equilibrium pressure is between about 2 microns and about 14 microns. In yet another embodiment, the cavity height dA at an equilibrium pressure is between about 2 microns and 30 microns.

The effective capacitance ($C_{eff}$), or capacitance across the total height (dD) of the diaphragm 102 (see FIG. 1), of an embodiment of a pressure sensor 100 with a capacitive transducer is estimated by Equation [3]

$$1/C_{eff} = 1/(C_C + C_A + C_B) \quad [3]$$

The effective capacitance is determined by treating the pressure sensor 100 with capacitive transducer as three capacitors in series, where $C_A$ is the capacitance across the cavity 110, $C_B$ is the capacitance across the diaphragm bottom surface 114, and $C_C$ is the capacitance across the diaphragm top surface 116. Each of these values are estimated by the following relations given in Equations [4]-[6]:

$$C_A = \epsilon_o A/d_A \quad [4]$$

$$C_B = \epsilon_o \epsilon_{rb} A/d_B \quad [5]$$

$$C_C = \epsilon_o \epsilon_{rc} A/d_C \quad [6]$$

In equations [4]-[6] the variables $\epsilon_o$ is the permittivity of free space or the fluid contained within the cavity 110 and $\epsilon_{rb}$ is the relative dielectric constant of the material of the diaphragm bottom surface 114 and $\epsilon_{rc}$ is the relative dielectric constant of material forming the diaphragm top surface 116 and A is the effective electrode area between the facing elements of the top electrode 104 and the bottom electrode 106.

Performance of Capacitive Transducer

Figure 24:
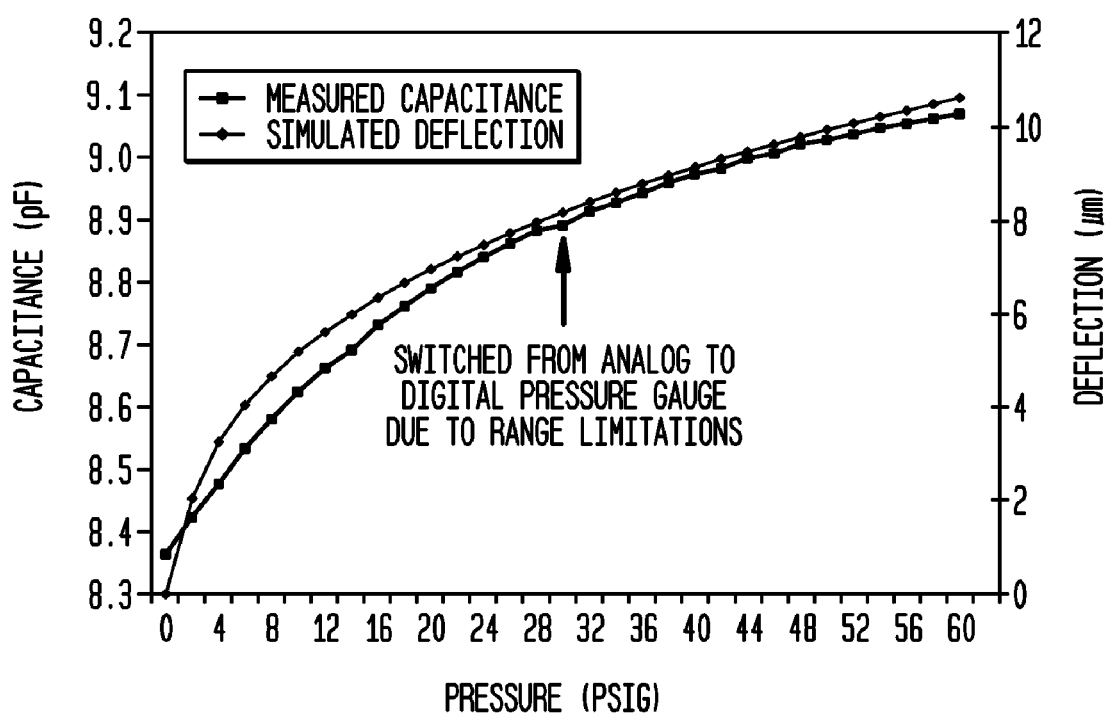
FIG. 24 is a chart detailing the experimentally measured change in capacitance versus change in external pressure for an embodiment of a ceramic pressure sensor.

Chart 2400, in FIG. 24, details the results from experimental measurements of one embodiment of a pressure sensor 100 with capacitive transducer. Chart 2400 describes in one trace the estimated or simulated deflection of the diaphragm top surface 116 in response to a specific external pressure 190, listed as Pressure (PSIG). The second trace on chart 2400 plots the measured capacitance of the pressure sensor 100, between the top electrode 104 and the bottom electrode 106 in response to the applied external pressure 190.

Temperature Sensitivity of Capacitive Transducer

Figure 8:
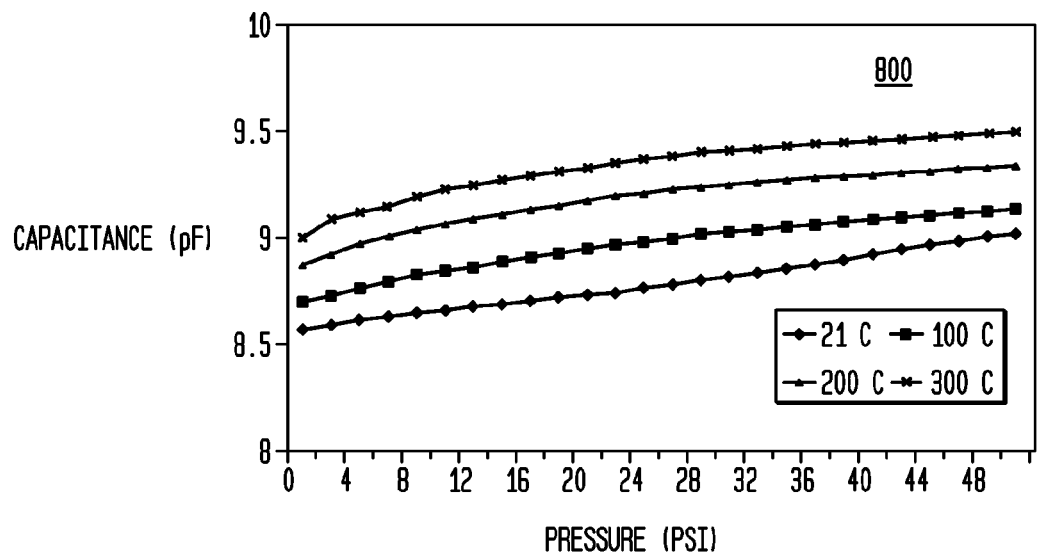
FIG. 8 is a chart depicting the experimentally measured capacitive response of an embodiment of a ceramic pressure sensor to applied pressure across multiple temperatures.

The results of an experimental temperature sensitivity test of an embodiment of the pressure sensor 100 with a capacitive transducer element and a cavity 110 height (dA) of 12 μm across multiple temperature ranges is detailed in chart 800 in FIG. 8. Chart 800 details multiple traces of the change in capacitance of an embodiment of the pressure sensor 100 with capacitive transducer across a range of pressure and temperature ranges. Across the multiple temperature ranges the embodiments of the pressure sensor 100 with capacitive transducer demonstrated an average pressure sensitivity of 9.2 fF/psi.

Piezoresistive Transducer

A second embodiment of the pressure sensor 1610 uses a piezoresistive transducer element. An embodiment of the pressure sensor 1610 with a piezoresistive transducer is shown in FIGS. 16 and 17. The piezoresistive element 1600 is fabricated using the same screen printing techniques described in the first embodiment. The piezoresistive element 1600 is created using a screen print piezoresistive ink that in one embodiment contains $RuO_2$ and $WO_3$ conductive oxide particles in a vitreous borosilicate glass matrix. In another embodiment, the piezoresistive element 1600 is selected from commercially available thick-film resistor compositions known to those of ordinary skill in the art. In still another embodiment, the piezoresistive element 1600 is selected from commercially available thick-film strain gauge compositions known to those of ordinary skill in the art. In yet another embodiment, the piezoresistive element 1600 is selected from commercially available thick-film strain gauge resistor compositions consisting of DuPont strain gauge composition 3554. The main conduction mechanism in this one embodiment is electron tunneling between the conductive grains through the dielectric matrix. The piezoresistive element 1600 in one embodiment shown in FIG. 16 is a 0.100"×0.100" square element. The effective pressure 190 applied to the diaphragm top surface 116 causes diaphragm deflection that results in a resistance change due to the piezoresistive effect.

Figure 19:
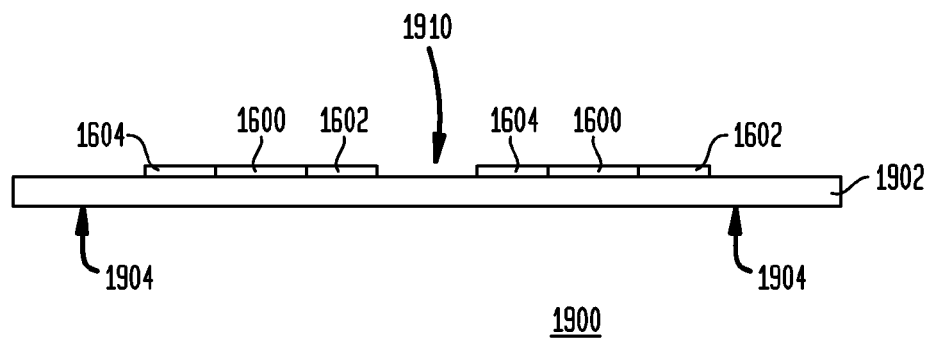
FIG. 19 details a model of an embodiment of a ceramic pressure sensor diaphragm with piezoresistive transducer materials.

FIG. 19 depicts a model 1900 piezoresistive sensor measurement system that physically mimics the functional characteristics of an embodiment of a pressure sensor 100 with multiple piezoresistive elements 1600. Specifically, the model 1900 has as model top diaphragm 1902 that mimics the diaphragm top surface 116. The model top diaphragm 1902 is subject to an applied force 1910 near the center of the model top diaphragm 1902 between a pair of supports 1904. The pair of supports 1904 mimic the effect of the walls 108, namely supporting the diaphragm top surface 116. The upper surface of the model top diaphragm 1902 has a pair of piezoresistive sensing elements 1600. Each piezoresistive sensing element 1600 has a first piezoresistive electrode termination 1602 and a second piezoresistive electrode termination 1604. The applied force 1910 causes the deflection of the model top diaphragm 1902 in a similar manner to the deflection caused by an external pressure 190 applied to the diaphragm top surface 116. The resulting deflection in this case compresses the pair of piezoresistive sensors 1600. The compression of the pair of piezoresistive sensors 1600 causes the resistance measured between the first piezoresistive electrode termination 1602 and a second piezoresistive electrode termination 1604 to decrease. In one embodiment, these measurements are taken individually. In a second embodiment, these measurements are taken in series in order to maximize the effect of the change in resistance. In yet another embodiment, the pair of piezoresistive sensors 1600 are arranged in a wheatstone bridge configuration with balancing resistors located on a portion of the model top diaphragm 1902 or, in other words, off the portion of the diaphragm top surface 116 that responds to an external pressure 190 whereby said balancing resistors are exposed to the environment, but are substantially not subject to an applied strain due to the applied force 1910.

Figure 20:
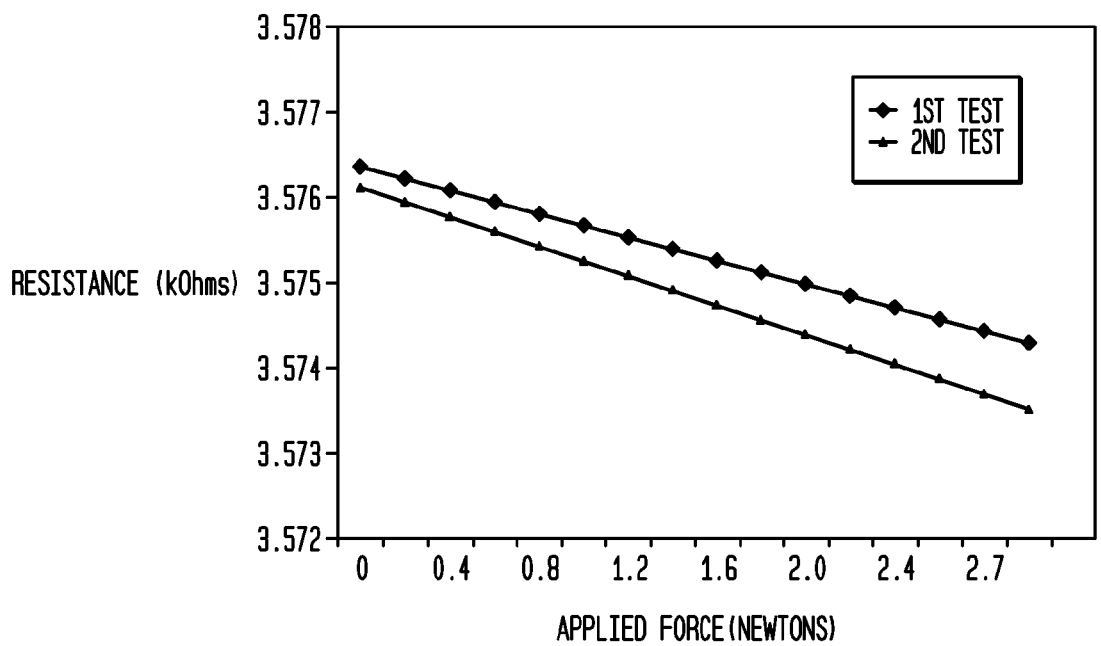
FIG. 20 is a chart detailing the experimentally measured change in resistance versus applied force for an embodiment of a ceramic pressure sensor diaphragm with piezoresistive transducer materials.

Chart 2000 shown in FIG. 20 presents exemplary experimental results for a model 1900 piezoresistive sensor measurement system showing the response as a change of resistance in response to an applied force 1910.

Second Exemplary Fabrication Process

The fabrication process 1800 of a pressure sensor 100 with a piezoresistive element 1600 builds on the same exemplary process 300 detailed above. A second exemplary fabrication process 1800 embodiment, uses the fact that the piezoresistive element 1600 does not require a facing electrode element, namely the bottom electrode 106, to eliminate specific elements of the exemplary fabrication process 300. Specifically, since the piezoresistive element 1600 is only mounted on the diaphragm top surface 116 of the diaphragm 102, steps two and three 304, 306 respectively, from the exemplary fabrication process are removed in the second exemplary fabrication process 1800.

Figure 18A:
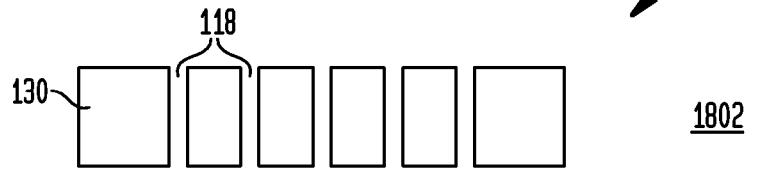
FIGS. 18a-f details cross-sections of an exemplary fabrication process for a second embodiment of a ceramic pressure sensor.
Figure 18B:
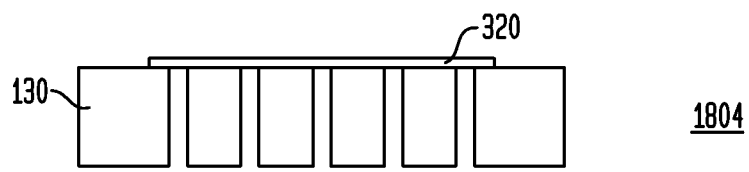
Figure 18C:
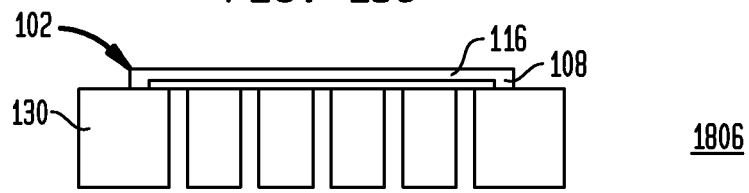
Figure 18D:
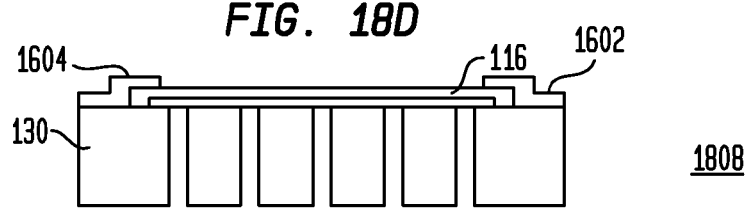
Figure 18E:
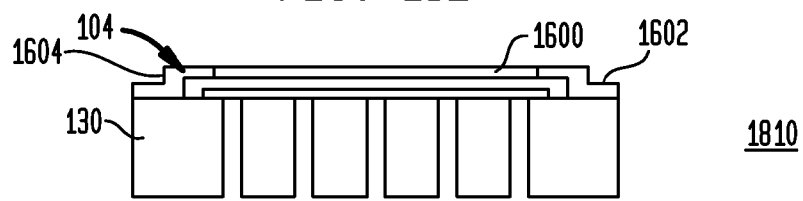
Figure 18F:
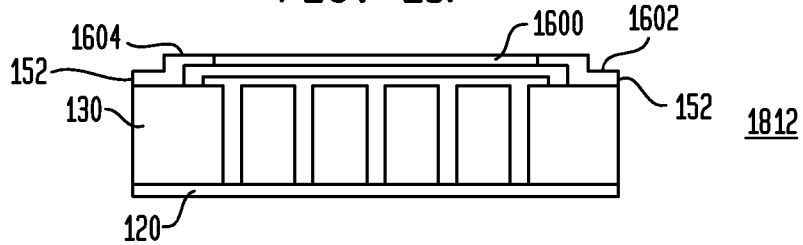

Step one 1082 in the second exemplary fabrication process 1800 is shown in FIG. 18a where a substrate 130 is selected with vias 118 in the first step 1802. Specifically, since there is no need for a matching bottom electrode 106 and no need for a diaphragm bottom surface 114 to cover the bottom electrode 106, both of these steps are eliminated. Instead, the sacrificial layer 320 is deposited directly on the substrate 130 as shown in step two 1804 of FIG. 18b. The remainder of the second exemplary fabrication process 1800 is substantially equivalent to the exemplary fabrication process 300. The diaphragm 102, comprising a diaphragm top surface 116 and diaphragm walls 108 is formed over the sacrificial layer 320 in step three 1806 of the second exemplary fabrication process 1800, shown FIG. 18c. Then, in this embodiment of the second exemplary fabrication process 1800, the top electrode 104 is formed using a piezoresistive screen print paste 1508 instead of the conductive paste 1508 used to create the top electrode 104 for an embodiment of the pressure sensor 100 with a capacitive transducer that is shown as step four 1808 and step five 1810 shown respectively in FIGS. 18d and 18e. The top electrode mask 1204 and the top electrode termination mask 1302 are adapted for use based on the characteristics of the piezoresistive screen-print paste 1508 and so that a pair of top electrode termination 152 layers are placed on the exposed portions of the ends of the top electrode 104 off the diaphragm 102. Finally, in step six 1812 the sacrificial layer 320 is dissolved by introducing a chemical etchant solution 420 into the vias 118 to release or free the diaphragm top surface 116 to freely flex in response to an external pressure 190.

Operation of an Embodiment of a Pressure Sensor with Piezoresistive Transducer

An embodiment of the pressure sensor 100 with piezoresistive transducer as shown in the embodiment depicted in FIGS. 16 and 17 uses a diaphragm 102 selected using the same criteria and performance conditions as outlined for an embodiment of the pressure sensor 100 with a capacitive transducer outlined above. In the case of a piezoresistive element 1600, the deflection of the diaphragm top surface 116 in response to an applied external pressure 190 strains the piezoresistive element 1600 deposited on the surface of the diaphragm top surface 116. The strain induced in the piezoresistive element 1600 causes a change in resistance that is measured electrically to estimate the applied external pressure 190.

Performance of Piezoresistive Transducer

Figure 21:
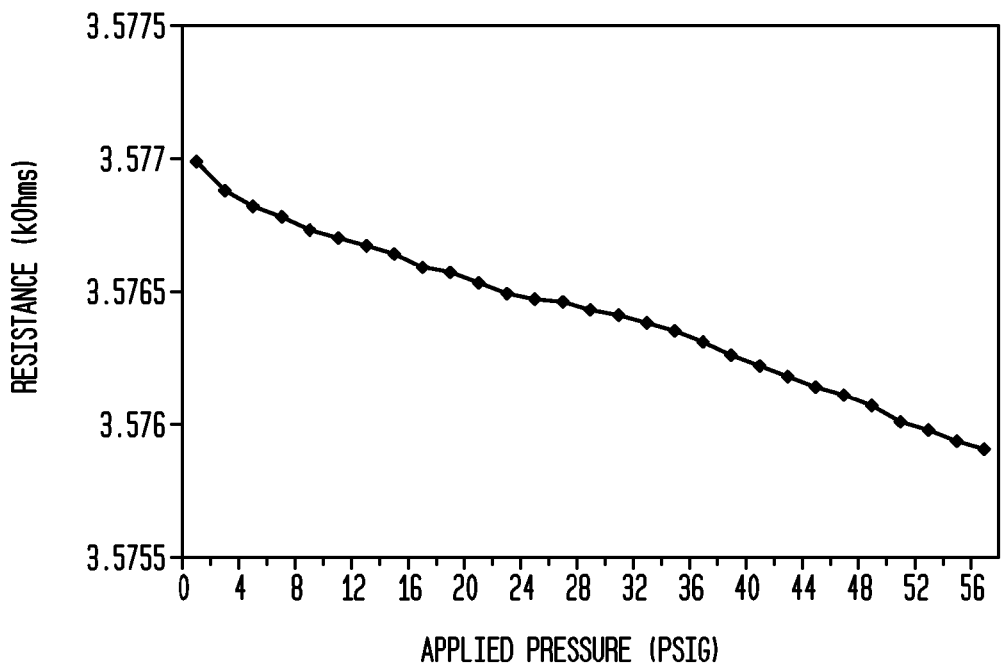
FIG. 21 is a chart detailing the experimentally measured change in resistance versus an external pressure applied to the diaphragm for an embodiment of a ceramic pressure sensor diaphragm with piezoresistive transducer materials.

The graph 2100 detailing the results of experimental tests on an embodiment of the pressure sensor 100 with a piezoresistive element 1600 applied to the diaphragm top surface 116 are presented in FIG. 21. The pressure sensor 100 with piezoresistive element 1600 are characterized across a range of external pressures from 0 to 60 psig. The average pressure sensor 100 sensitivity was −53.6 mΩ/psi.

Temperature Sensitivity of Piezoresistive Transducer

Figure 22:
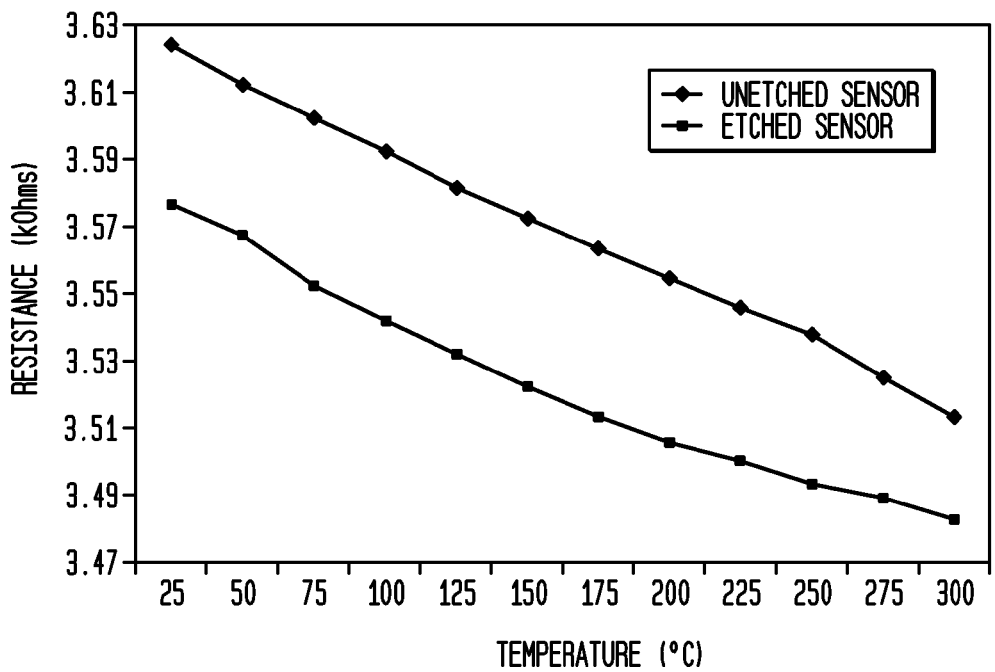
FIG. 22 is a chart detailing the experimentally measured change in resistance versus change in temperature for an embodiment of a ceramic pressure sensor diaphragm with piezoresistive transducer materials.

The results of an experimental temperature sensitivity test of an embodiment of the pressure sensor 100 with a piezoresistive transducer is shown in chart 2200 in FIG. 22. Chart 2200 details the measured resistance across the piezoresistive element 1600 through a range of temperatures for both an etched die 902 and an unetched die 902, where unetched refers to a pressure sensor 100 that still has a sacrificial layer 320 prior to removal by etching and etched refers to a pressure sensor 100 with the sacrificial layer 320 removed. The average measured temperature sensitivity of one embodiment was −96.7 ppm/C.

Integrated Capacitive and Piezorestitive Embodiment

Figure 23:
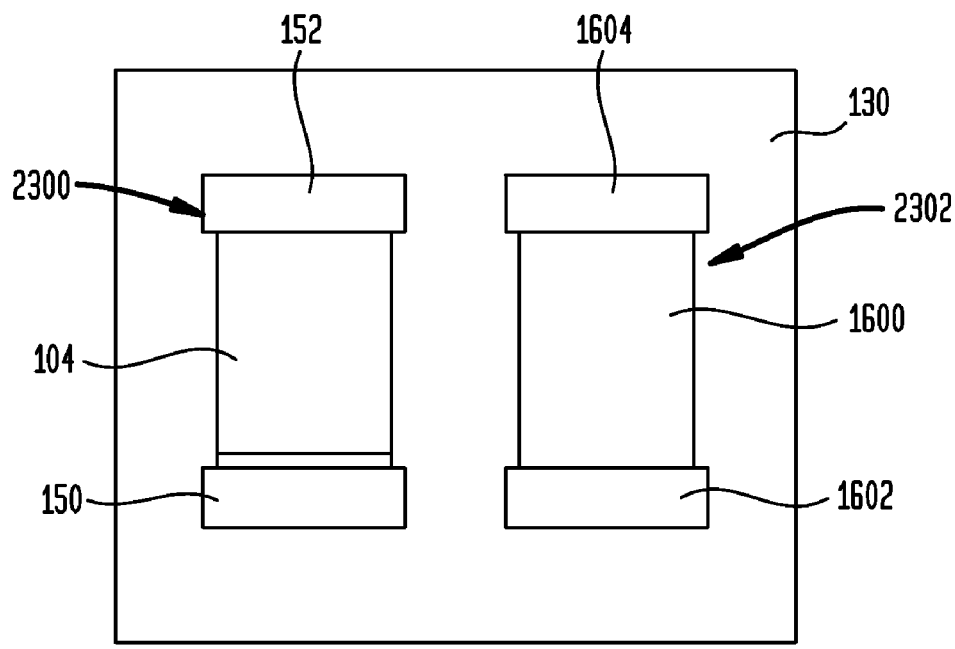
FIG. 23 depicts a planar view of yet another embodiment of a ceramic pressure sensor with both capacitive and piezoresistive transducer materials.

In another embodiment of the pressure sensor 100, a capacitive sensor comprising a top electrode 104 and a bottom electrode 106 over a diaphragm 102 and a piezoresistive sensor element 1600 over a diaphragm 102 are combined on a single die 902. In the embodiment depicted in FIG. 23 there is an embodiment of a pressure sensor 100 with a capacitive transducer 2300 and an embodiment of the pressure sensor 100 with a piezoresistive transducer 2302 fabricated on separate, individual diaphragms 102. In a second embodiment, the capacitive transducer 2300 and the piezoresistive sensor element 1600 are fabricated on the same diaphragm 102. In either embodiment, the capacitive transducer 2300 is used to provide dynamic measurements of changes in the external pressure 190. The piezoresistive transducer 2302 provides static measurements suitable for measuring slowly varying and or static external pressure 190. In another embodiment, the signals produced by the piezoresistive transducer 2302 and the capacitive transducer 2300 are combined electronically to reduce the effects of thermal changes on the pressure sensor 100. In yet another embodiment, a thick film resistor is printed on the substrate top surface 134 to provide a temperature sensor to allow for temperature compensation of the data from the capacitive and piezoresistive transducer 2300, 2302 pair.

Integrated Piezoresistive Element with Temperature Compensating Piezoresistive Element In yet another embodiment of the pressure sensor 100, a pair of piezoresistive sensor elements 1600 are used together with a single thick film resistor printed on the substrate top surface 134 to provide a temperature sensor to allow for temperature compensation of the data from the piezoresistive sensor element 1600.

Integrated Sensor Electronics Package

Figure 25:
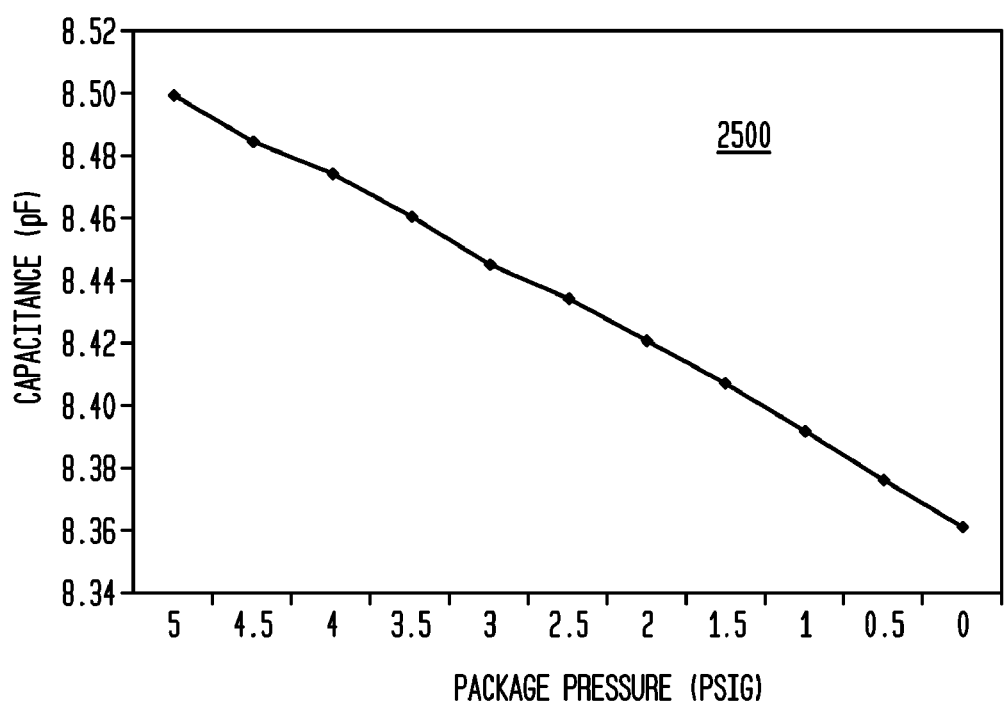
FIG. 25 is a chart detailing the experimentally measured change in capacitance versus change in internal package pressure for an embodiment of a ceramic pressure sensor enclosed within a hermetically sealed electronics package.
Figure 26:
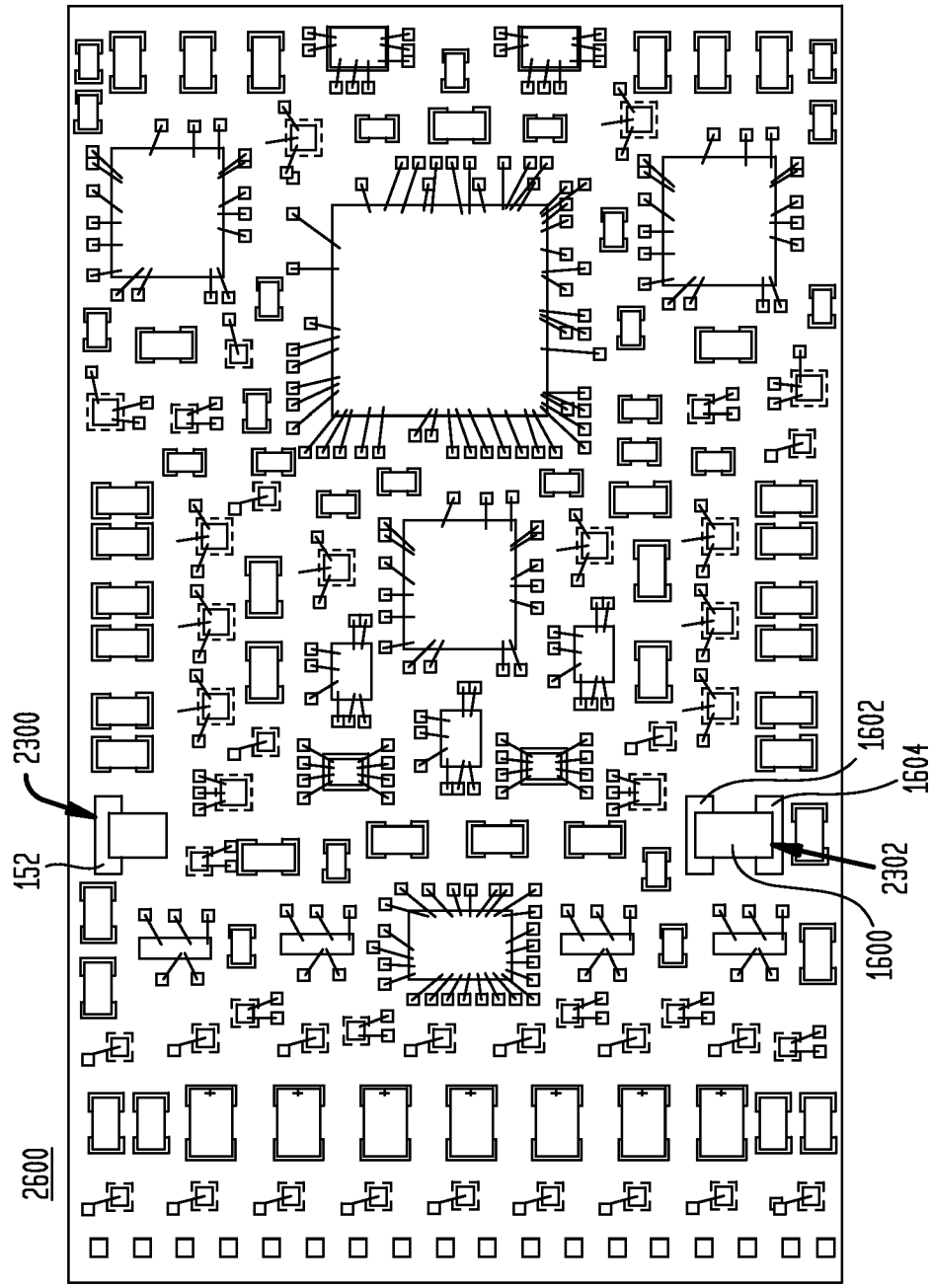
FIG. 26 depicts a top planar view of an embodiment of a ceramic pressure sensor integrated with an integrated electronics package.

The various embodiments of a pressure sensor 100 of the present invention are integrated with traditional circuit fabrication techniques to create an integrated sensor electronics package module 2600 depicted in FIG. 26. The integrated electronics package module 2600 incorporates both a pressure sensor 100 with a capacitive transducer 2300 and an embodiment of the pressure sensor 100 with a piezoresistive transducer 2302 fabricated on separate, individual diaphragms 102. The integrated pressure sensor 100 allows active monitoring of the integrated electronics package module 2600 to detect flaws or breaks in the hermiticity that are predictors of imminent failure of the integrated electronics package module 2600. An example of the response signal from a pressure sensor 100 mounted inside an integrated electronics package module is shown in the chart 2500 in FIG. 25. The chart 2500 shows the change in capacitance of the pressure sensor 100 in response to changing pressure detected within the integrated electronics package module 2600.

CONCLUSION

The embodiments of the invention shown in the drawing and described above are exemplary of numerous embodiments that may be made within the scope of the appended claims. It is contemplated that numerous other configurations of a pressure sensor may be created taking advantage of the disclosed approaches. It is the applicant's intention that the scope of the patent issuing herefrom will be limited only by the scope of the appended claims.

What is claimed is:

1. A method for producing a pressure sensor comprising the steps of:
   (a) creating a via through a ceramic substrate, said via extending from a first aperture, defining a perimeter, on a top surface of said ceramic substrate to a second aperture on a bottom surface of said ceramic substrate;
   (b) depositing a sacrificial layer on a portion of said top surface said ceramic substrate wherein said sacrificial layer covers said first aperture of said via;
   (c) screen printing a diaphragm having an upper surface and side walls on said ceramic substrate wherein said diaphragm covers said sacrificial layer;
   (d) depositing an upper sensor element on at least a portion of said upper surface of said diaphragm and extending to at least a portion of a second region of said top surface of said substrate;
   (e) depositing a termination electrode on said second region of said substrate;
   (f) introducing an etchant into said second aperture of said via; and
   (g) etching said sacrificial layer with said etchant to release said upper surface of said diaphragm to allow said upper surface of said diaphragm to flex in response to an applied pressure differential across a portion of said diaphragm.

2. A method of claim 1, wherein said diaphragm is transparent and further comprising the step of:
   (h) monitoring said etching of said sacrificial layer at said step (g) through said diaphragm.

3. A method of claim 1, whereby said upper sensor electrode is fabricated from a piezoresistive material.

4. A method of claim 1, wherein said etchant is a solution of potassium iodide.

5. A method of claim 4, whereby said etching is performed in an ultrasonic, heated bath.

6. A method of claim 1, further comprising the steps of:
   (h) depositing a bottom sensor element on said top surface of said ceramic substrate below said sacrificial layer, within the extents of said first region and around a setback region defined from the perimeter of said first aperture; and
   (i) depositing a bottom diaphragm on said bottom sensor element such that said bottom diaphragm is adapted to extend beyond the extents of said bottom sensor element and extend into said setback region.

7. A method of claim 1, further comprising the steps of
   (h) depositing a first sealing layer on said bottom face of said ceramic substrate substantially covering said second aperture of said via to create a via fill feature within said second aperture and extending into said via;
   (i) drying and firing said first sealing layer;
   (j) depositing a second sealing layer on said bottom surface of said ceramic substrate substantially covering said first sealing layer; and
   (k) drying and firing said second sealing layer.

8. A method of claim 1 whereby each said steps (b) (c) (d) and (e) further comprise the steps of:
   i. depositing a screen-printing paste on a screen-print mesh, said screen-printing paste comprising the material to be deposited and screen print vehicles;

ii. printing said screen-printing paste through a mask formed in said screen-print mesh to form a desired feature geometry;
iii. drying said screen-printing paste to remove said screen print vehicles and create a green feature; and
iv. firing said green feature at an elevated temperature to create the feature.

* * * * *